United States Patent
Cotter et al.

(10) Patent No.: US 6,272,548 B1
(45) Date of Patent: Aug. 7, 2001

(54) DEAD RECKONING ROUTING OF PACKET DATA WITHIN A NETWORK OF NODES HAVING GENERALLY REGULAR TOPOLOGY

(75) Inventors: David Cotter, Woodbridge; Martin C Tatham, Ipswich, both of (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/000,455

(22) PCT Filed: Jul. 26, 1996

(86) PCT No.: PCT/GB96/01823

§ 371 Date: Jan. 28, 1998

§ 102(e) Date: Jan. 28, 1998

(87) PCT Pub. No.: WO97/05725

PCT Pub. Date: Feb. 13, 1997

(30) Foreign Application Priority Data

Jul. 28, 1995 (GB) .................................................. 9515536
Sep. 19, 1995 (EP) .................................................. 95306590

(51) Int. Cl.$^7$ ................................................. G06F 15/173
(52) U.S. Cl. .......................... 709/239; 709/238; 709/243
(58) Field of Search ..................................... 709/238, 239, 709/242, 245, 243; 340/827, 825.03; 370/351; 379/273, 221

(56) References Cited

U.S. PATENT DOCUMENTS

| | | | | |
|---|---|---|---|---|
| 4,731,878 | * | 3/1988 | Vaidya ................................. | 359/165 |
| 4,805,091 | * | 2/1989 | Thiel et al. ............................ | 712/12 |
| 4,811,210 | * | 3/1989 | McAulay ............................... | 364/200 |
| 4,825,206 | * | 4/1989 | Brice, Jr. et al. ................ | 340/825.02 |
| 4,933,933 | * | 6/1990 | Dally et al. ........................... | 370/406 |
| 5,105,424 | | 4/1992 | Flaig et al. . | |
| 5,327,552 | * | 7/1994 | Liew ......................................... | 714/4 |
| 5,341,234 | * | 8/1994 | Suzuki et al. ....................... | 359/117 |
| 5,452,075 | * | 9/1995 | Edwall ................................. | 356/73.1 |
| 5,488,608 | * | 1/1996 | Flammer, III ..................... | 370/85.13 |
| 5,602,838 | * | 2/1997 | Kartalopoulos ..................... | 370/406 |
| 5,606,551 | * | 2/1997 | Kartalopoulos ..................... | 370/406 |
| 5,617,413 | * | 4/1997 | Monacos .............................. | 370/400 |
| 5,742,585 | * | 4/1998 | Yamamoto et al. ................. | 370/223 |
| 5,875,185 | * | 2/1999 | Wang et al. ......................... | 370/331 |
| 5,912,753 | * | 6/1999 | Cotter et al. ........................ | 359/137 |
| 5,917,820 | * | 6/1999 | Rekhter ............................... | 370/392 |

OTHER PUBLICATIONS

Cotter et al, Ultrafast Self–Routing Networks (Invited), BT Labs (Ipswich, UK), Paper Presented at the Thirteenth Annual Conference on European Fibre Optic Communications and Networks, Brighton, England 1995.

Kawanishi et al, "200 Gbit/s, 100 km TDM Transmission Using Supercontinuum Pulses with Prescaled PLL Timing Extraction and All–Optical Demultiplexing", NTT Optical Network Systems Laboratories 1–2356 Take, Yokosuka, Kanagawa, 238–03, Japan, 1995.

Sauer et al, "A Soliton Ring Network", J. Lightwave Technol., vol. 11, pp. 2182–2190 (1993).

(List continued on next page.)

Primary Examiner—Mark Rinehart
Assistant Examiner—Jason D. Cardone
(74) Attorney, Agent, or Firm—Nixon & Vanderhye P.C.

(57) ABSTRACT

A packet is routed by "dead reckoning" on a network having a generally regular topology. The packet is received at a node where a local routing decision is made. The packet is output in a direction selected according to the routing decision. The packet carries in addition to a destination address a directional flag indicating explicitly the preferred direction of onward travel and the routing decision is made using this flag. Several flags may be used, corresponding to different dimensions of the network.

36 Claims, 16 Drawing Sheets

OTHER PUBLICATIONS

Cotter et al, "Algorithm for Binary Word Recognition Suited to Ultrafast Nonlinear Optics", Elect. Lett., vol. 29, pp. 945–946 (1993).

Cotter et al, "Self–Routing of 100 Gbit/s Packets Using 6–bit 'Keyword' Address Recognition", Elect. Lett. (in press).

Maxemchuk, "Regular Mesh Topologies in Local and Metropolitan Area Networks", AT&T Tech. J., vol. 64, pp. 1659–1685 (1985).

Maxemchuk, "Routing in the Manhattan Street Network", IEEE Trans. on Commun., vol. 35, pp. 503–512 (1987).

Maxemchuk, "Comparison of Deflection and Store–and–Forward Techniuqes in the Manhattan Street and Shuffle–Exchange Networks", Proc. Infocom '89, pp. 800–809 (1989).

Choudhury et al, Performance Analysis of Deflection Routing in the Manhattan Street Network, Proc. ICC '91, pp. 1659–1664 (1991).

Hunter et al, "Optical Contention Resolution and Buffering Module for ATM Networks", Elect Lett., vol. 29, pp. 280–281 1993).

Prucnal, "Optically–Processed Self–Routing, Synchronisation and Contention Resolution for 1D and 2D Photonic Switch Architectures", IEEE J. Quant. Electr., vol. 29, pp. 600–612 (1993).

Partridge, Gigabit Networking, Addison Wesley, pp. 143–147 (1994).

Liew, "A General Packet Replication Scheme for Multicasting in Interconnection Networks", Proc. Infocom '95, pp. 394–400 (1995).

Baransel et al, "Routing in Multihop Packet Switching Networks: Gigabit–per–second Challenge", IEEE Network, vol. 9, pp. 38–61 (May/Jun. 1995).

Bononi et al, Soliton Ultrafast All–Optical Mesh Networks, IEE Proc. J., vol. 140, pp. 285–290 (1993).

Nowatzyk et al, Are Crossbars Really Dead? The Case for Optical Multiprocessor Interconnect Systems, ISCA '95 Intern. Conf. on Comp. Architecture, Margherita Ligure, Italy (Jun. 1995).

Glesk et al, "All–Optical Address Recognition and Self–Routing in a 250 Gbit/s Packet–Switched Network", Elect. Lett., vol. 30, pp. 1322/1323 (1994).

Shabeer et al, "Self–Synchronisation Scheme for High–Speed Photonic Networks", Elect. Lett., (in press).

Globecom, vol. 1, Dec. 1993, USA, pp. 119–125, F. Borgonovo et al, "Unslotted deflection ro all–optical networks".

Phoenix Conference on Computers and Communications, Mar. 1989, USA, pp. 214 T.Y. Chung, "A routing scheme for datagram and virtual circuit services in MSN".

Osborn et al., "A Comparative Study of Flow Control Methods in High–Speed Networks", IEEE, pp. 353–359, 1993.*

Matta et al., "Type–of–Service Routing in Dynamic Datagram Networks", IEEE, pp. 8a.2.1–8a.2.8, 1994.*

Dolev et al., "Bubbles: Adaptive Routing Scheme for High–Speed Dynamic Networks", STOC' 95, pp. 528–532, 1995.*

* cited by examiner

DEAD RECKONING ROUTING OF PACKET DATA WITHIN A NETWORK OF NODES HAVING GENERALLY REGULAR TOPOLOGY

BACKGROUND TO THE INVENTION

1. Field of the Invention

The present invention relates to a method of routing packets on a network, and to networks and nodes adapted to implement the method.

2. Related Art

Packet routing networks may be used, for example, to interconnect the different processors of a multi-processor computer, or as the basis of a LAN interconnecting a number of different computers. In the future, it is envisaged that such networks might be used for distributed processing applications such as the provision of shared virtual-reality environments—"virtual meeting places"—or for fast complex visualisation of data, for example in financial institutions. Such a network might also be used for the internal architecture of a packet switch used, for example, in a telecommunications network.

All the examples discussed above will benefit from networks capable of operating at ultrafast speeds, e.g 10 GBit/s or more. To achieve such speeds, it is essential that there is efficient routing of packets to minimise transit times from source to destination and without the process of making routing decisions itself providing a bottleneck. It has previously been proposed to use a class of techniques known as "self-routing", as described, for example, in the present applicant's copending international application PCT/GB 95/01176.

Self-routing is a method of navigation through a packet-switched network in which the onward route at each node is determined locally without consulting a network database in a centralised or distributed form (for a formal definition of self-routing, reference is made to the paper by Baransel et al cited below as reference [14]). The routing decision is made based on information (usually the destination address) extracted from the packet header. In such a network, the time required to make a routing decision must be no longer than the transmission time for a single packet. If this condition is not observed the system becomes unstable since the ratio of the packet arrival rate to the service rate at a node can become greater than 1, so that queue lengths can grow indefinitely. For high transmission speeds, or for short packet lengths, this stability criterion is more difficult to satisfy. It becomes a very severe constraint in the case of ultra-high speed networks operating at multi-Gbit/s transmission rates, particularly when the transmission format uses fixed-length packets or cells of at most a few tens of bytes in length.

Assuming, for example, the 53-byte length of ATM cells and a peak bit rate of 100 Gbit/s [1], a node has only a few nanoseconds to perform the following tasks for each cell that arrives: select the appropriate output link on which the cell should be transmitted; and resolve contention. The situation can be alleviated by breaking these tasks into a number of separate procedures which are performed in pipe-line mode. Nevertheless it is essential for ultrafast networks that the procedures used for routing and contention resolution should be as simple as possible to minimise the processing time.

A further motivation for simplifying the routing and contention-resolution procedures in ultrafast networks is the technology limitations of photonic devices. Recent experiments have demonstrated the potential for photonic networks to carry data at single-wavelength, single-channel rates approaching 100 Gbit/s and beyond [2]. In these networks the transmission bit-rate is higher that the speed capability of electronic devices. However, the procedures for routing involve combinations of processes at two distinct levels of granularity—the bit level and the packet level [1]. For ultrafast networks, processes at the bit level require photonic devices with response times at least as fast as the bit period (picosecond scale), whereas processing at the packet level can be performed using high-speed electronics at the packet rate (nanosecond scale). Photonic logic devices are much less developed than electronic ones, they have primitive functionality and are relatively poorly integrated, power hungry and costly and are unlikely to achieve a comparable level of development for many years to come. Therefore a further requirement for ultrafast self-routing networks is that the number and complexity of bit-level processes should be reduced to the absolute minimum.

U.S. Pat. No. 5,105,424 discloses one example of a routing scheme, intended for use within an integrated electronic massively parallel processor. The scheme involves determining at the source of a packet the entire path that the packet should follow from the source to the destination. The path is defined as a sequence of relative addresses and is added to the message packet in the form of a header. Routing is carried out by routing automata which are associated with the different computing nodes. The direction in which the packet is to be output is determined at the automate by referring to the relative address in the header, and the header is updated by deleting the parts that relate to the previous portion of the path. This has the disadvantage that the address has to be read, processed and modified at every node. This imposes a significant overhead of complex bit-level processing. Also, since this approach does not allow for deflection from the predetermined path, deflection routing cannot be used. This makes it necessary for the nodes to include large buffers to resolve contention under conditions of heavy traffic load.

The paper by T Y Chung published in Phoenix Conference on Computers and Communications, March 1989, USA, pages 214–218, discloses a routing scheme which, like that in the U.S. patent discussed above, fully determines the route of the packet at the source, and programs this route in the header of the packet. It differs however in that the route is determined using a numerical algorithm rather than from a look-up table at the source. But as in the above scheme, the intermediate routing nodes, termed in this paper "tandem nodes", simply read the routing information and act upon it, rather than making an autonomous routing decision. The approach adopted in this paper still requires that all the routing information coded into the packet header must be read bit-by-bit, updated, and the packet header must be overwritten with the updated routing information. Again, this amount of bit-level processing is a significant disadvantage in the context of the system intended to operate at high bit rates. Although the paper makes reference to the possibility of deflection routing, the routing scheme, because of its deterministic nature, is not well adapted for such an approach. In this scheme, if deflection occurs, then the deflecting node has to recompute the routing information for the entire onward path leading to the packets destination, just as though the deflecting node which effects the deflection was itself the original source of the packet. Since these methods use predetermined routes encoded in the packet header, neither is a self-routing method.

SUMMARY OF THE INVENTION

According to a first aspect of the present invention, there is provided a method of routing a packet carried on a network having a generally regular topology comprising:

(a) receiving a packet at a node;
(b) reading a destination address and a directional flag, both of which are carried with the packet, the directional flag indicating explicitly a preferred direction of onward travel for the packet;
(c) making a local routing decision according to the value of the directional flag; and
(d) outputting the packet from the node in a direction selected in accordance with the routing decision.

The term "directional flag" as used herein denotes a simple unit of data which indicates a preferred direction of travel of a packet from its source to its destination without fully determining the path, that is the specific sequence of links and routing nodes followed by the packet, from the source of the packet to the destination. It may comprise just a single bit for each dimension of the network.

Correspondingly, the term "local routing decision" as used herein denotes a selection of output paths which is made locally at the routing node and which is not predetermined when the packet leaves its source.

The present invention provides a self-routing protocol with minimal processing overhead, yet that can provide a routing efficiency and network performance comparable to that of the most sophisticated routing mechanisms. It uses an approach based on the concept of dead reckoning (self-navigation without the use of landmarks). This approach greatly reduces the total processing at network nodes, and also simplifies and minimises bit-level processes. Like random routing, another primitive protocol, dead reckoning is robust, tolerant of network irregularities and faults, is simple to implement and manage, and is readily scalable. However, unlike random routing which is typically very inefficient, dead reckoning can provide good routing efficiency and network performance.

Preferably the packet is an optical packet carried on an optical network.

Although the method provides particular advantages in optical networks, especially where photonic devices are used, it is by no means limited to use with such networks. It also gives advantages when used, for example, with high-speed electronic networks, or with optical networks using electronic switching logic.

Preferably the network has at least two dimensions, and the packet carries at least two directional flags, one for each dimension of the network.

The network may comprise a mesh-connected array of nodes such as the Manhattan Street Network described in further detail below. The dead reckoning method then makes use of the fact that the network has a regular or predominantly regular layout. For example, in a regular rectangular mesh network with rows and columns associated with the principal axes of the compass, a packet may have knowledge that its destination is located north and east. The packet self-navigates through the network by choosing whenever possible to travel in a direction that leads broadly towards the destination. When the packet encounters a routing node, it simply instructs the node as to the preferred direction of onward travel: the node does not compute an optimum direction. The main tasks for the node are merely to check whether the packet's destination address matches that of the node either wholly or in part, and to resolve contention.

According to a second aspect of the present invention there is provided a node for routing packets carried on a generally regular network, the node comprising:
a) an input for receiving a packet;
b) a routing decision unit for making a local routing decision using information carried by the packet, the routing decision unit including means responsive to a directional flag carried by the packet and indicating explicitly a preferred direction of onward travel;
c) a plurality of outputs for directing the packet onto the network in different respective directions; and
d) means for directing a packet to different respective ones of the plurality of outputs depending on an output of the routing decision unit.

According to a third aspect of the present invention there is provided a network having a generally regular topology and including a plurality of nodes in accordance with the second aspect of the invention.

According to a fourth aspect of the present invention, there is provided a computer system comprising a plurality of processors interconnected by a network in accordance with the third aspect of the invention.

DESCRIPTION OF THE DRAWINGS

Systems embodying the invention in its different aspects will now be described in further detail, by way of example only, and contrasted with the prior art, with reference to the accompanying drawings, in which.

DETAILED DESCRIPTION OF EXEMPLARY EMBODIMENTS

Figure 2:
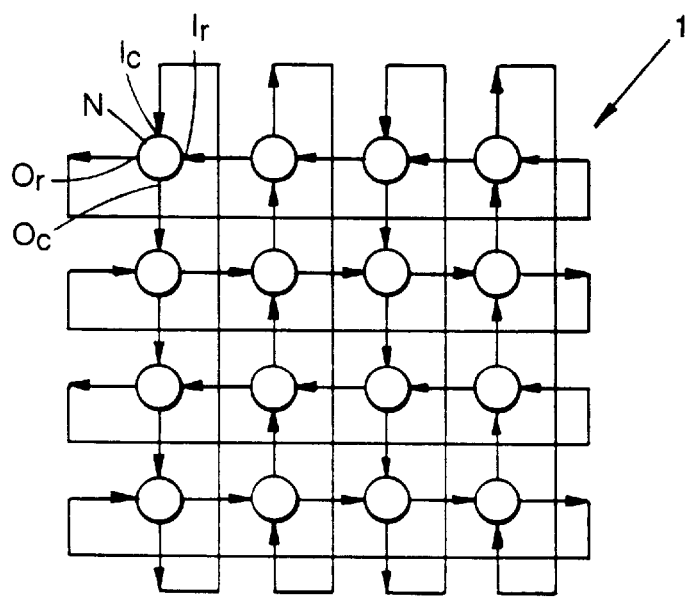
FIG. 2 shows a 16-node Manhattan Street Network, utilizing switches set in accordance with the novel routing scheme of FIG. 1.

As shown in FIG. 2, one example an optical network 1 in accordance with this invention comprises a plurality of nodes N interconnected in a regular mesh pattern. In the example shown in FIG. 2, a Manhattan Street Network (MS-Net) topology is used. This is a two-connected, regular network with unidirectional links. There is an even number of rows and columns with two links arriving and two links leaving each node N. Logically, the links form a grid on the surface of a torus, with links in adjacent rows or columns travelling in opposite directions. FIG. 2 shows a 16-node (4×4) MS-Net.

Figure 4:
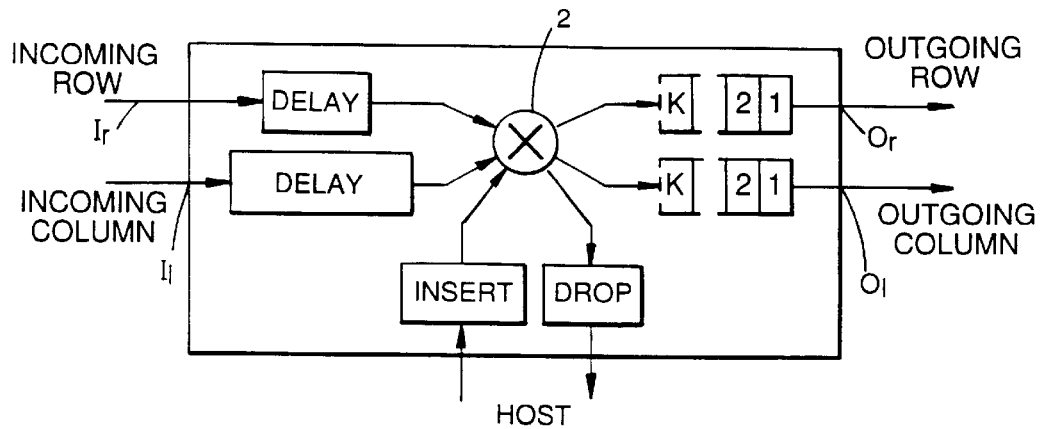
FIG. 4 is a schematic showing the structure of one of the nodes of FIG. 2.

FIG. 4 shows the structure of an individual node N. It incorporates a switch 2 which is set to route an incoming packet either to the node's row output $O_r$, to the column output $O_c$ or to the host local to the node. This host may, for example, be one of a number of processors connected to respective nodes and forming in combination a multi-processor parallel processing computer system. The switch 2 also has an input from the host so that, when appropriate, the node can insert a packet from the local host onto the network.

Figure 1:
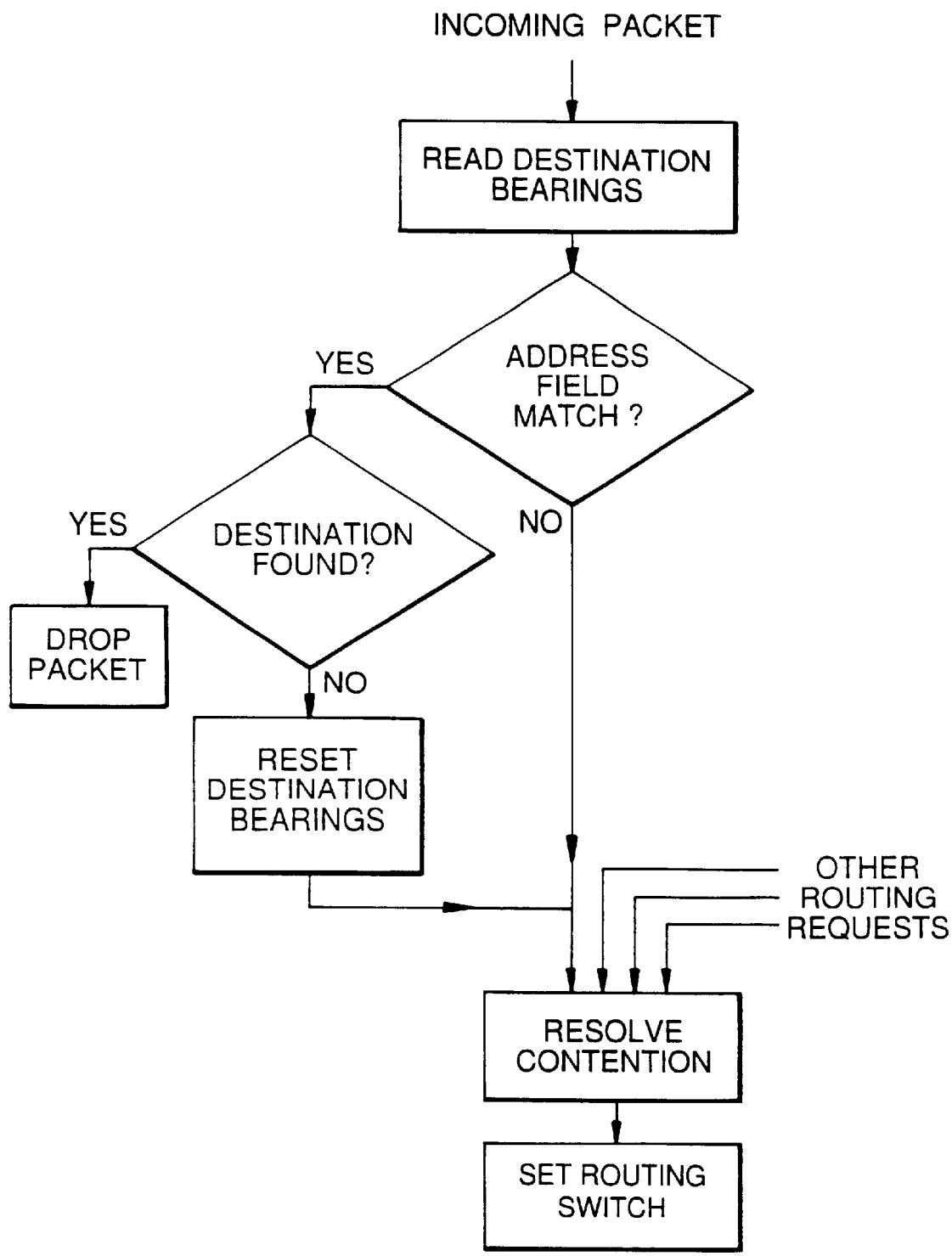
FIG. 1 is a flow diagram illustrating the logic of a self-routing protocol implementing the present invention.

The switch is set using a novel routing scheme illustrated in FIG. 1 and termed by the present inventors "dead reckoning". This method of operating the node is described in further detail below. Circuits implementing this method are also described below with reference to FIGS. 16 to 20, and examples of appropriate components are identified in the section below headed "Implementing Technologies".

Dead Reckoning

In the traditional approach to self-routing, each packet carries its destination address in the header. At each network node encountered by the packet along its route, the destination address is read and this information is used to compute the optimum path for onward transmission. Typically the routing algorithm is made tractable by using a sequential arithmetic addressing scheme for the nodes which reflects the regularity of the network topology.

The dead-reckoning approach introduced here also relies on the network having a regular (or mainly regular) structure. In the layout of the logical interconnections, the links connecting nodes are oriented parallel to the principal axes of the topology. In this case, in addition to the destination address, each packet carries some elementary information about the general direction of its destination. For example, in a two-dimensional rectangular grid network with rows and columns associated with the principal axes of the compass, a packet may have knowledge that its destination is located somewhere 'north and east'. The packet self-navigates through the network by choosing, whenever possible, to travel in a direction that leads broadly towards the destination. When the packet encounters a routing node, it simply instructs the node as to the preferred direction of onward travel; the node does not compute an optimum direction. As noted above, the main tasks for the node are merely to check whether the packet's destination address matches that of the node either wholly or in part, and to resolve contention.

The logical function of a routing node using dead reckoning is summarised in FIG. 1. The bit-level process of detecting a match between corresponding fields in the packet destination address and the node address can be performed very efficiently using an elementary single-step operation with ultrafast photonic devices [3–5], without the need to read and process the full destination address bit-by-bit.

When a packet is first placed on the network, a look-up table or shortest-path algorithm is used to determine the directional bearings towards the destination node, and this information is coded into the packet header, together with the destination address. The algorithm or look-up procedure has to operate only at the relatively slow access rate of the local host. The place from which a new packet starts out is the only point in the network where the packet has access to this routing information. The necessary amount of directional information that each packet must carry can be very small: just one bit for each principal axis of the network topology. For example, as described in the following section, the directional information is only 2 bits in the case of a Manhattan Street Network (MS-Net). This directional information is carried by the packet across the network to its destination, and is modified only occasionally during the journey. The information may be modified when the packet encounters a routing node whose address contains a field that correctly matches the corresponding field of the packet destination address (e.g. in a MS-Net when the routing node is situated in the same row or column as the packet destination). The destination is found when the two addresses are wholly matched.

Manhattan Street Networks

The dead-reckoning approach is now described in more detail in the context of the well-known MS-Net [6–8], which, as described above, is a two-connected, regular network with unidirectional links. The attractive features of this network stem from its rich connectivity. The MS-Net is well suited to a simple deflection strategy for contention resolution. It performs well under high loading with no buffers ('hot potato' routing) or a small number of buffers [8,9]. This is an especially useful feature for ultrafast photonic networks, in which technological limitations constrain practical buffer depths to small values [10]. The rich connectivity also makes for a robust network, able to survive multiple link failures.

In the MS-Net a routing decision must be made at every node encountered by a packet. Maxemchuk [7] describes various deterministic routing rules that operate with excellent efficiency.

These rules make use of the regular structure of the network, and depend on an addressing scheme that names rows and columns in monotonic arithmetic sequences. The drawback of these routing rules is the need to read the full destination address and perform several computations of various complexity for every packet at every routing node.

Dead-reckoning routing rules

In the dead-reckoning approach, each packet finds a path through the network by following directional bearings towards the destination. The destination is located at the intersection of the 'destination row' and the 'destination column' in the network mesh. At the place at which the packet is first inserted into the network, it is given two initial bearings relative to the principal axes of the network layout to indicate the shortest path towards the destination. These 'destination bearings' can be represented by a single 2-bit word, one bit for each of the principal axes. A convenient shorthand is to designate the logical orientation of columns in the MS-Net as 'north-south', and rows are oriented 'east-west'. (Notice however that in the toroidal topology of a MS-Net, the north-south directional orientation is regular and continuous, unlike the north-south latitude of a globe which has singularities at the poles.) Therefore a suitable set of destination bearings for a packet might be 'north and east'. The destination bearings are carried by the packet on its journey through the network, and at each node of the network where a routing decision is required the routing preference is selected according to this simple rule:

a) A packet should, if possible, travel in the direction of one of its destination bearings. If two or no such directions are available, the packet does not care which path is selected (except in case b or c below).

The destination bearings are modified only in the particular circumstances now described. At each node the destination address is compared with the row and column names of the node address to see whether the destination row or column has been located (and obviously if both row and column addresses match, then the destination is found.) Supplementary routing rules apply when a packet has located its destination row or column:

b) If a packet encounters its destination row (column), and if that row (column) is oriented in the direction of one of the destination bearings, then the packet should turn into it if possible, otherwise proceed as in the main rule a.

c) If a packet is travelling along its destination row or column in the direction of one of the destination bearings, it should continue in that direction if possible, otherwise proceed as in the main rule a.

d) If a packet crosses over its destination row (column), then the north-south (east-west) destination bearing for the packet must be checked and reset if necessary.

e) If a packet is travelling along its destination row (column), whether or not in the direction of a destination bearing, and then a turn is made, the north-south (east-west) destination bearing must be checked and reset if necessary.

These simple routing rules provide a basis on which a packet may select its onward path at each crosspoint with good efficiency. A routing logic processor having the task of executing these rules requires just 4 bits of information for each packet: i) the destination bearings (2 bits); ii) whether or not the destination row (column) matches the node row (column) (1 bit each). Using these 4 input bits, the routing logic is sufficiently simple that the rules can be executed with hard-wired electronic circuitry using a small number of elementary boolean logic gates, without the need for arithmetic, registers or look-up tables. This logic circuit can be designed with several parallel strands, and the maximum length of any strand is about 4 gates. The routing logic processor can therefore operate at high speed, allowing the optimum path to be determined at a rate suitable for self-routing in multi-Gbit/s networks.

Because the network is isotropic, the routing instructions are common to every crosspoint in the network. An important difference between the dead reckoning approach and existing routing schemes is that dead reckoning does not require the network rows and columns to be named in any organised fashion; they can be named in an entirely arbitrary way since the routing does not rely on node addresses being arranged in a particular sequence.

Routing efficiency

A comparison of the routing efficiencies obtained using dead reckoning, random routing, and more sophisticated routing schemes is presented in Table I for various sizes of MS-Net. It is assumed here that there is no congestion (contention resolution is considered in following sections), and that packets follow the routing rules exactly. Where a rule indicates that there is no preference between the two outgoing links from a node, one of the paths is selected at random with probability 0.5. The average distance between nodes (in terms of the number of hops) for each routing scheme is calculated by determining the average distance between each source and destination in the network. The efficiency of a routing scheme is the average shortest path between nodes divided by the average distance between nodes using the routing scheme. In the case of the dead-reckoning routing scheme, a shortest-path algorithm (based on Maxemchuk's Deterministic Rule 1 [7]) is used once only to select the first output link from the source and also to determine the initial destination bearings.

Figure 3:
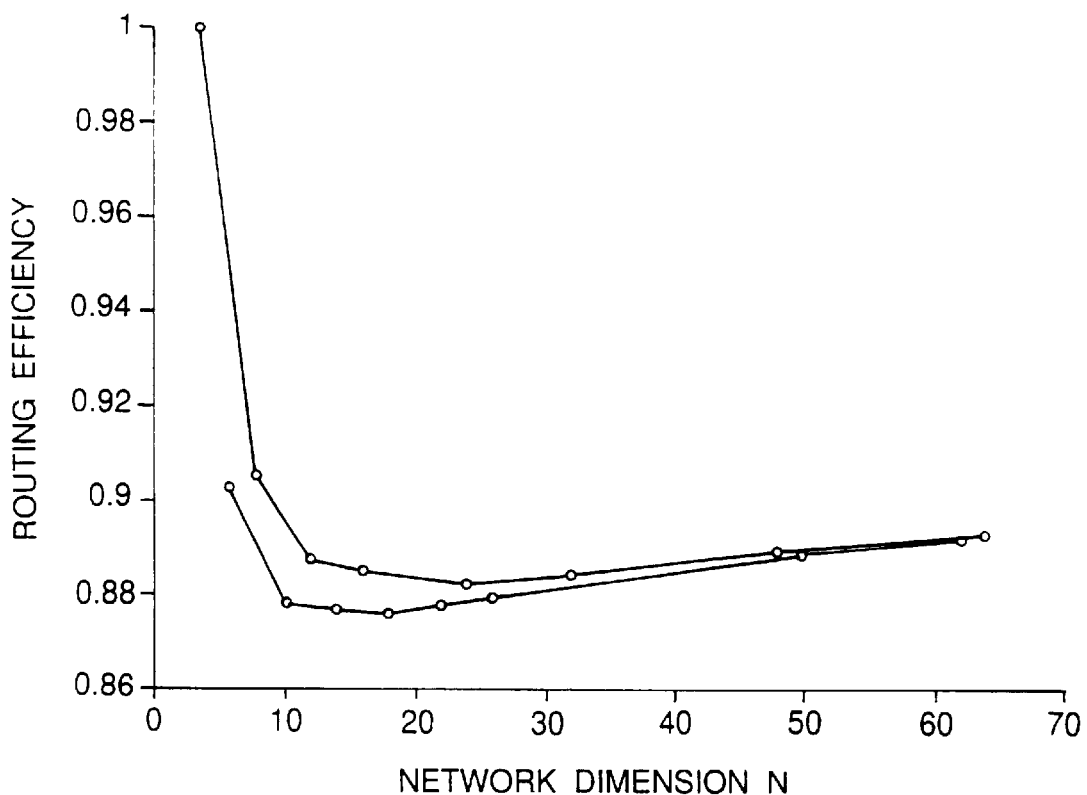
FIG. 3 is a graph showing routing efficiency using dead reckoning in MS-Nets of size n×n, versus network dimension n.

FIG. 3 shows the variation of the routing efficiency with dead reckoning in MS-Nets of size N×N, with N=4 to 64 (16 to 4096 nodes). For networks larger than 8×8, the efficiency is slowly varying with network size and is always greater than 87%.

Table I shows that the level of efficiency with dead reckoning is comparable to the efficiency that can be obtained using a sophisticated shortest-path routing algorithm at each node. However the dead reckoning approach is much simpler: it avoids the need to read the full packet-destination address and compute data such as the relative address of a node, its quadrant and the direction of the links emanating from the nodes. This is a very significant advantage for ultrafast networks.

Node structure

The network carries fixed-length packets, and it is slotted so that any given link may carry at most one packet in each time slot. The structure of a node in this network is shown in FIG. 4. Packets arriving on the two input links (one from a row and one from a column) are given a suitable relative delay so that the time slots are aligned at the routing switch [11]. In each time slot the node will accept up to two packets from the network for forwarding. If a packet is recognised as having reached its destination it is dropped from the network and diverted to the local host. Simultaneously, or if an empty time slot is detected on an incoming link, a packet may be accepted from the local host and inserted into the network. All the packets that enter the routing switch (whether received from the network for forwarding or inserted from the local host) are routed to one of the outgoing links according to the rules of the dead-reckoning scheme, following the preferences indicated by the 'destination bearings' where possible.

The nodes have output buffers on both ports able to hold a small number of packets (K=0 to 64). Depending on the buffer size, the node can employ a 'hot-potato' strategy (K=0) or deflection-routing strategy (K>0) to resolve the contention that can arise if two packets indicate a preference to travel outwards on the same link [6]. In the event of contention, both packets are directed to the chosen output buffer provided there is at least one buffer slot available, with the order of the two packets chosen randomly. However, if there is no available buffer space, then one of the two packets (chosen at random) is deflected to the other output port. When two packets are present at the routing switch and one of them has no particular outward routing preference, then that packet will be the candidate for deflection. When a packet has no particular outward routing preference and there are no other constraints, the packet will be assigned to either output port chosen at random.

There are two simple strategies that can be used to deal with new packets that the host wishes to have inserted into the network. One strategy is to hold packets in the source buffer until their preferred output port becomes available; an alternative is to insert packets into the network immediately any output link or buffer becomes available. We choose the latter strategy here. Therefore it is assumed that if there are f available time slots where f=0, 1 or 2 (i.e. 2-f packets are received from the network for forwarding), then f new packets may be inserted from the host, irrespective of whether their preferred output port is available (i.e.packets may incur a deflection at their source node). To cater for this, the shortest-path algorithm or look-up table at the source should provide two sets of destination bearings for each new packet: one set will be used if the packet is forwarded to its preferred output port at the source node, whilst the other set will be used if the packet is deflected to the other port. The destination bearings are chosen so that the new packet will find the shortest available path from the given output port of the source node to the destination, assuming there are no further deflections. This strategy has the advantage that, on average, a new packet spends less time in the access queue, but the disadvantage that if the packet is deflected at the source node the shortest available path from the non-preferred output port may contain more hops. We use a shortest-path algorithm based on Maxemchuk's Deterministic Rule 1 [7] to select the preferred output link from the source and also to determine the initial destination bearings to be used with and without deflection at the source node.

Network performance

It can be expected that the dead-reckoning scheme for self-routing will be degraded when the network is heavily loaded because a packet may be deflected to a position where the destination bearings it carries no longer lead to the destination by the shortest route. To investigate this, we have simulated the performance of a 64-node (8×8) MS-Net as a function of the traffic load. The generation of new packets at each node is memoryless, and the mean rate of packet generation at each node is the same. The choice of destination nodes follows a uniform distribution, and the insertion and routing of new packets is independent of the state of the output buffers in the network nodes.

Figure 5:
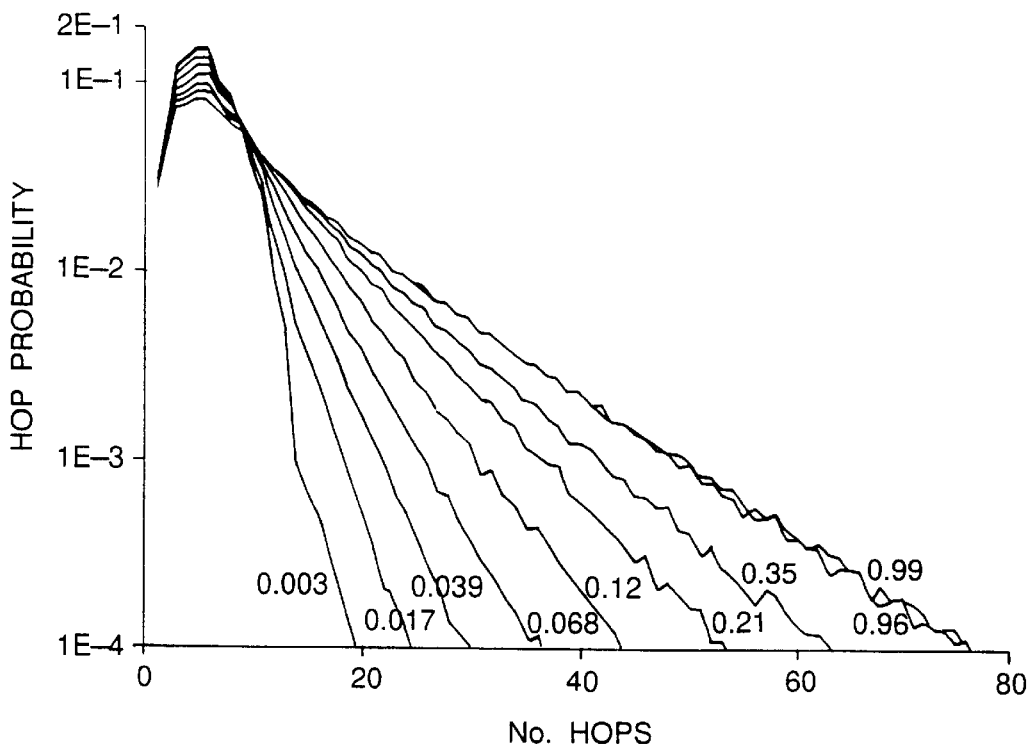
FIG. 5 is a graph showing the hop probability distribution for routing using the dead-reckoning protocol in an 8×8 MS Net with no buffers for various values of the probability of packet insertion in a free slot, 0.003 to 0.99.
Figure 6:
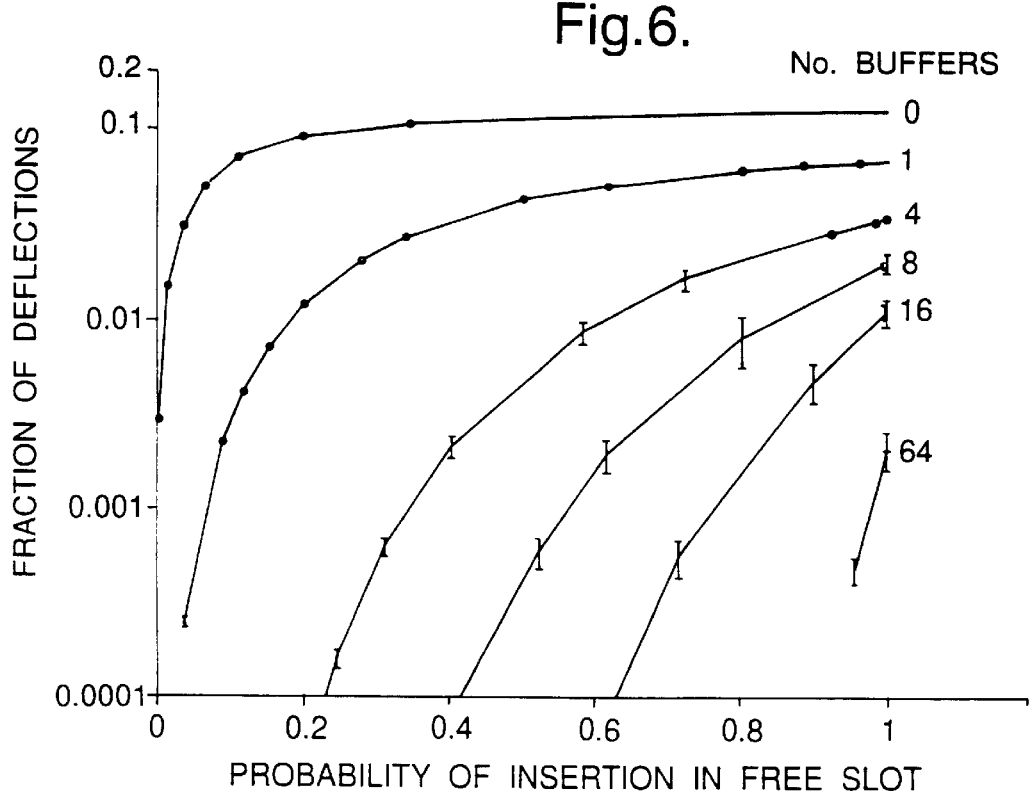
FIG. 6 is a graph showing the fraction of packet deflections for an 8×8 MS Net embodying the present invention as a function of the probability of packet insertion in a free slot.

FIG. 5 shows the probability distribution of the number of hops used between source and destination, for various levels of the offered load, with hot-potato deflection (K=0). The offered load is represented by $P_A$, the probability that a source will insert a new packet into a free time slot. The exponential decrease in hop probability versus number of hops, even for $P_A$ as high as 0.99, demonstrates the reliability of the dead-reckoning routing protocol; we have detected no tendency for packets to become trapped or loop indefinitely. This confirms that although the effect of deflections is to increase the number of hops, deflections do not endanger the integrity of the dead-reckoning method. The integrity of the scheme is guaranteed for the MS-Net by the regular, cyclic topography of the network. FIG. 6 shows the fraction of packet deflections as a function of $P_A$, for various buffer sizes. The maximum fraction of deflections, even with no buffers, is only 12.2%, because of the large number of packets that enter nodes without caring which output link is selected.

Figure 7:
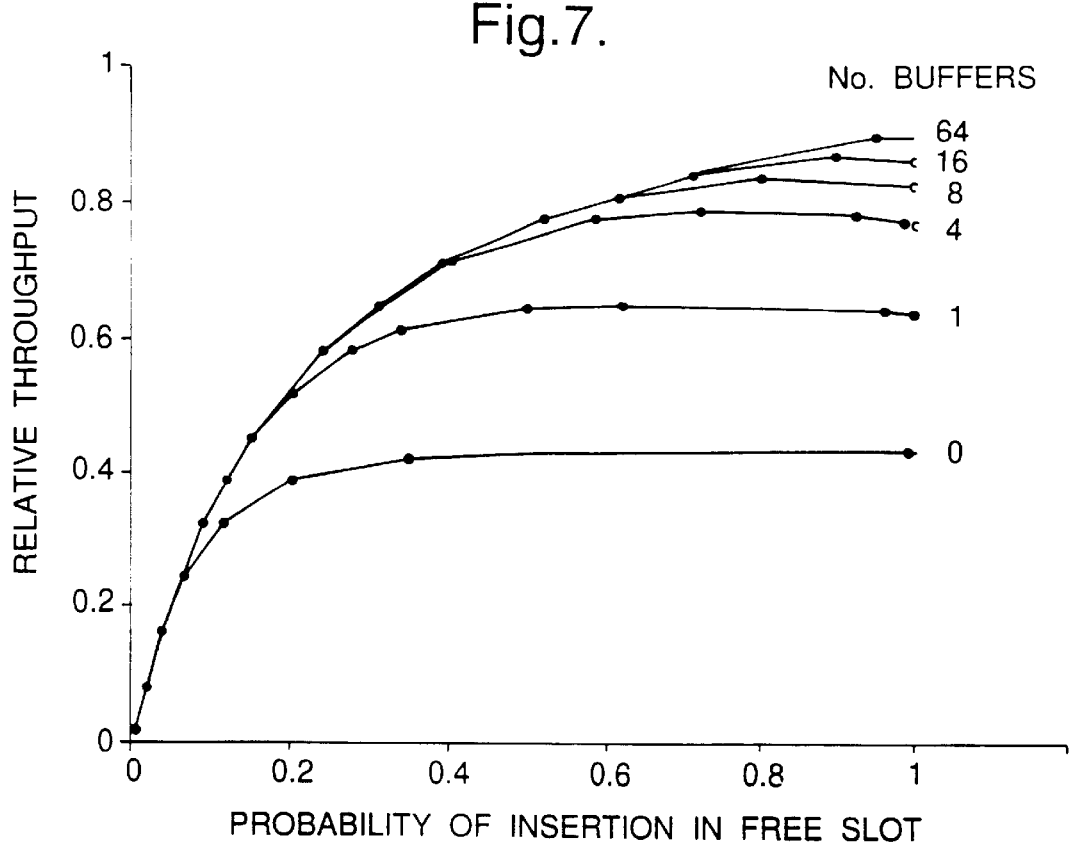
FIG. 7 is a graph showing relative throughput of an 8×8 MS-Net embodying the present invention as a function of the probability of packet insertion in a free slot.
Figure 8:
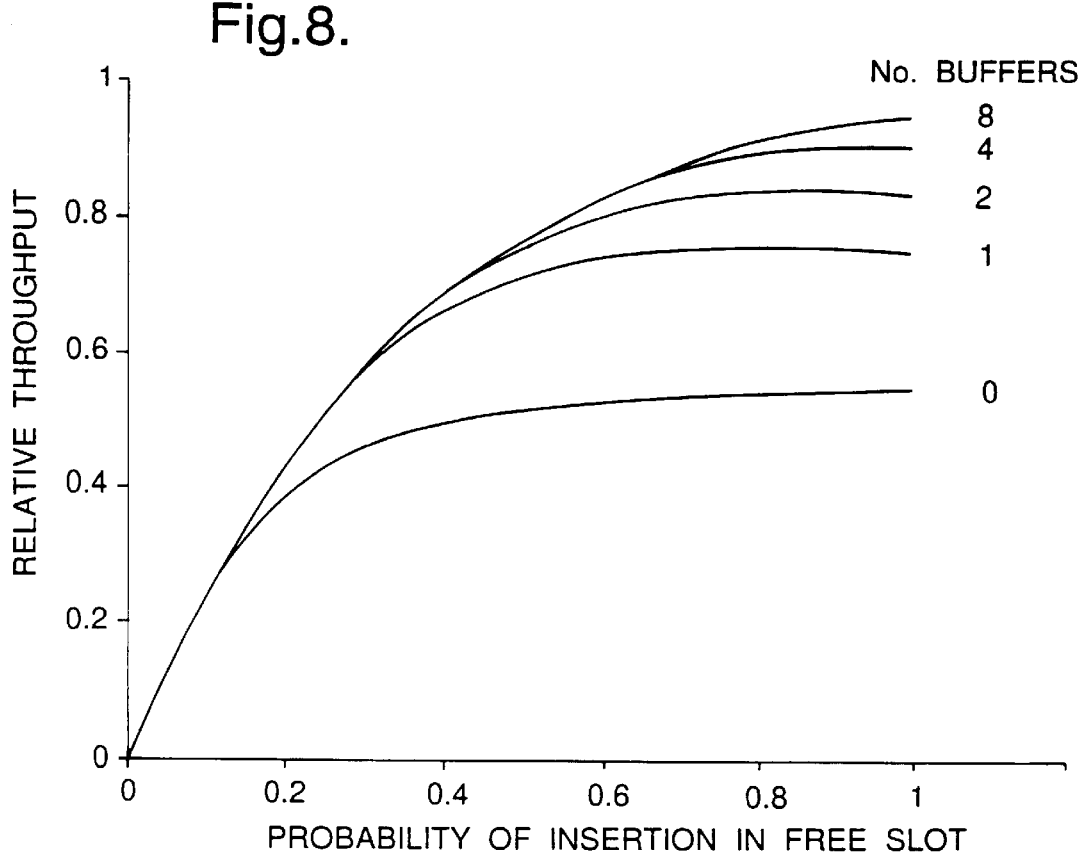
FIG. 8 is a graph showing the relative throughput of an 8×8 MS-Net using shortest-path routing as a function of the probability of packet insertion in a free slot.

A crucial measure of network efficiency is the throughput. In steady state, the rate at which packets are accepted from the source by the network should equal the rate at which the network delivers packets to the destination. The steady-state throughput is therefore the average number of packets delivered per node per time slot. The theoretical maximum throughput for the MS-Net (the maximum store-and-forward throughput with shortest-path routing) is 2 divided by the average shortest path in terms of the number of hops [8]. For the 8×8 MS-Net, this maximum throughput is 2/5.02=0.399. It is useful to define the relative throughput as the actual throughput normalised by the theoretical maximum. This normalisation compensates for the dependence of the actual throughput on network size, and provides an indication of how much of the maximum possible throughput is being achieved [8]. FIG. 7 shows the relative throughput versus PA for various buffer sizes. With hot-potato deflection (K=0), a relative throughput of 43% is obtained at maximum network load, and this increases to 79% with a buffer depth K=4. This performance obtained using the primitive dead-reckoning approach compares quite well with the performance of the same 8×8 MS-Net using a shortest-path algorithm for routing every packet at every node, as shown in FIG. 8 [8, 9]. In that case, a relative throughput of 55% is obtained with hot-potation deflection at maximum network load, increasing to 91% with a buffer depth K=4. The conclusion is that the price paid for the simplicity of using dead reckoning is only a modest decrease in relative throughput. Moreover, since the amount of processing needed at the nodes for dead reckoning is minimised, the network can sustain operation at much higher speed by using photonic devices (for example, packet header address matching at 100 Gbit/s line rate has been demonstrated recently [5]). Therefore, despite the modest reduction in relative throughput, a substantial gain in the absolute network throughput in terms of information delivered per second can be achieved.

Figure 9:
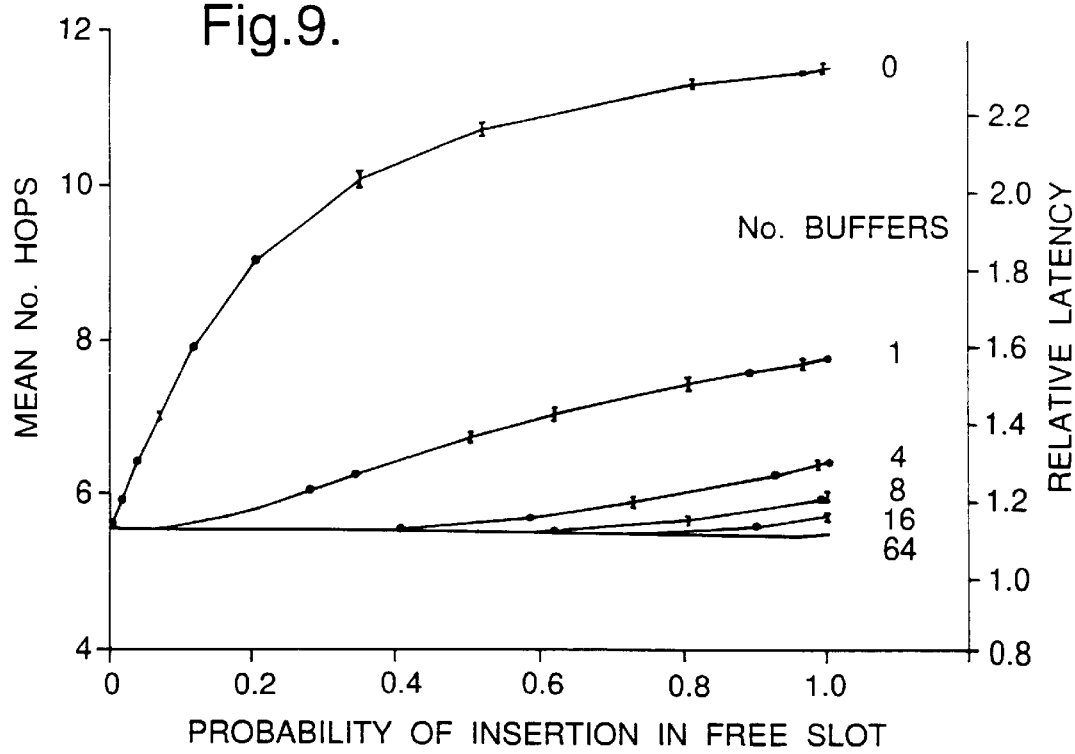
FIG. 9 is a graph showing the mean number of packet hops for an 8×8 MS-Net embodying the present invention as a function of the probability of packet insertion in a free slot.

Another important performance metric is delay. The total delay consists of two parts: the time that a packet must wait in the host buffer before being inserted into the network, and the network delay itself (the time for a packet to traverse the network from source to destination). Here we consider only the latter aspect. The network delay introduced by each hop is the sum of three components: the propagation delay, the delay deliberately introduced at the node to align time slots (FIG. 4), and the queuing delay in the output buffers. The inventors have found that in an ultrafast photonic network the dominant component is the propagation delay. This is because the time for transmission of a single packet is small. For example, as mentioned in the introduction, the time slot required to accommodate a 53-byte ATM cell at 100 Gbit/s with time guard bands and other overheads is around 6.5 ns [1], or equivalently a distance of only 1.3 m in optical fibre. Therefore for an average link length greater than a few tens of meters, and assuming that practical photonic buffers are limited to a few time slots in depth [10], the propagation time far exceeds the other components of delay. It follows, assuming the link lengths are similar, that it is important to minimise the number of hops that a packet must take in travelling from source to destination. FIG. 9 shows the mean number of hops as a function of $P_A$ in the 8×8 MS-Net using the dead-reckoning protocol, for various buffer sizes. Also shown on the right-hand scale is the 'relative latency', defined as the mean number of hops normalised to the average shortest path (5.02 hops in this case). This shows that a buffer depth of 4 is sufficient to reduce the propagation delay to within 30% of the theoretical minimum.

As already mentioned, the MS-Net architecture has well-known attractive features that stem from its rich connectivity. It performs well under high loading and is able to survive multiple link failures. However, it has also been criticised in several ways: it does not support multicasting; it is said not to support a guaranteed service; and the network permits packets to be reordered [12]. These are criticisms that are less significant in the case of ultrafast photonic networks. First, multicasting in the MS-Net must be performed using higher-level protocols (efficient strategies are being developed currently [13]), but effective replication of the payload is very simple in the optical domain using passive splitting devices. Second, it is true that certain traffic patterns will produce many deflections, causing the MS-Net to send some packets over many additional hops. However since the network latency is very small, dominated by propagation delay, this may not be an important consideration for connectionless data, or even for traditional delay-sensitive connection-oriented applications such as voice and video. Third, it is a debatable point as to whether the reordering of packets is a significant drawback. It has been suggested that for many foreseeable applications, packet reordering is either not required in real time, or can be achieved in real time using a reassembly buffer of modest size [14].

In ultrafast photonic networks using picosecond optical pulses for transmission the most practical approach is to allow packets (including the destination address and other header data) to propagate through the network without modification in transit and without opto-electronic regeneration. This avoids opto-electronic bottlenecks, and also avoids the need for ultra-short laser sources and clock-recovery mechanisms with picosecond precision embedded in the network [1]. However the dead-reckoning technique relies on each packet carrying some additional elementary information about the general direction of its destination, and this information may be modified occasionally during the packet's journey from source to destination. The necessary amount of information carried by each packet can be very small: just 2 bits in the case of the MS-Net that we have described in detail. The rate of this information (2 bits per packet time slot) is slow enough that it can be easily communicated on a link-by-link basis using a channel that is out-of-band for the remainder of the packet. It is unnecessary for this signalling information to be carried in the same ultrafast format as the remainder of the packet header and payload. It could be carried on a separate wavelength, in a separate time segment, or on a physically-separated parallel channel, provided always that packet-level synchronism is maintained across each link.

Several additional advantages of the dead-reckoning scheme have been identified. The naming of rows and columns in the network can be arbitrary; there is no need to follow an organised sequential scheme for assigning addresses. It is not even necessary for the nodes to know the dimensions of the network. This means that additional rows and columns can be introduced into the network at any position and at any time, without the need for alterations or adjustments to the existing network (apart from updating the look-up tables or shortest-path algorithms used at the sources). Special schemes for introducing rows and columns, such as fractional addressing [7], are not required. Since the basic routing rules may be executed in hard-wired electronic logic circuitry for speed, this is a considerable advantage. This also greatly simplifies the processes of planning, evolution and management of the network.

The dead-reckoning scheme is tolerant of network irregularities. If nodes and links are added or fail in a perverse fashion, then locally the network may bear little resemblance to the regular structure. Whereas deterministic routing rules based on regular, sequential arithmetic addressing may fail in these circumstances, the dead-reckoning scheme appears to have good survival, although the routing efficiency is degraded. As described, our simulations for a MS-Net have shown that the dead-reckoning scheme is robust to deflections, even under very heavy load. We also note that the scheme is robust to the accidental corruption of the 'destination bearings' data carried by a packet. These robust features are guaranteed in a network such as the MS-Net which has a regular, cyclic topography. In other words, if the packet is deflected far from its preferred path, or if the destination bearings become lost or corrupted en route, the packet will continue in a non-optimum direction and so lengthen its journey. But because the network is cyclic, the packet will eventually encounter its destination row and column, and the protocol ensures that correct bearings are then automatically re-established. Although less efficient, dead reckoning can also be implemented in a non-cyclic network with boundaries. In this case the nodes at a boundary should 'reflect' packets from the boundary, whilst reversing one or more of the destination bearings if necessary.

Ultrafast photonic networks capable of interconnecting processors and workstations at multi-Gbit/s speeds are becoming a practical reality [1, 3, 15, 16]. Significant progress has been made recently with the first demonstrations of the generation of photonic packets at 100 Gbit/s peak rate [1], address recognition [5, 17], and bit-level self-synchronisation techniques [18]. The dead-reckoning approach described here allows these recent technical advances in photonics to be applied in ultrafast mesh networks using optical self-routing, with massive throughput and speed.

Applications of ultrafast packet interconnection network

These applications are described by way of example only, many other uses of the routing method, node and networks of the present invention are possible. This description assumes that the network is of the Manhattan Street type, which is the example discussed in detail in above. Therefore it is assumed that the nodes are 2-connected (2 input lines and 2 output lines at each node).

The applications of the network depend simply on the type of hosts that are connected and the geographical extent of the network.

Figure 10:
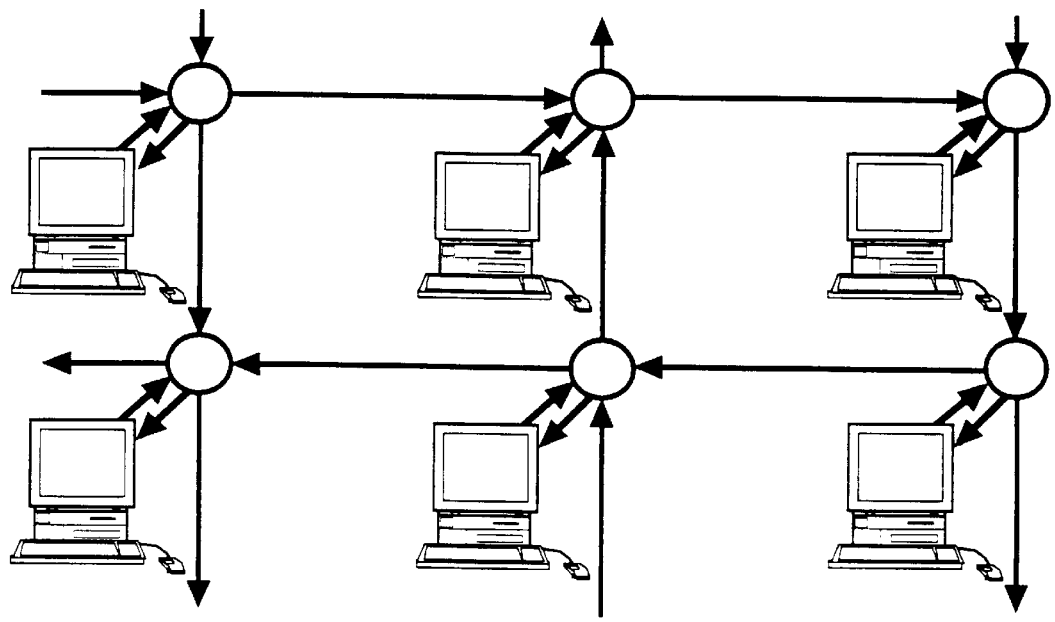
FIG. 10 shows a network embodying the present invention used as a LAN interconnecting a number of computers.
Figure 11:
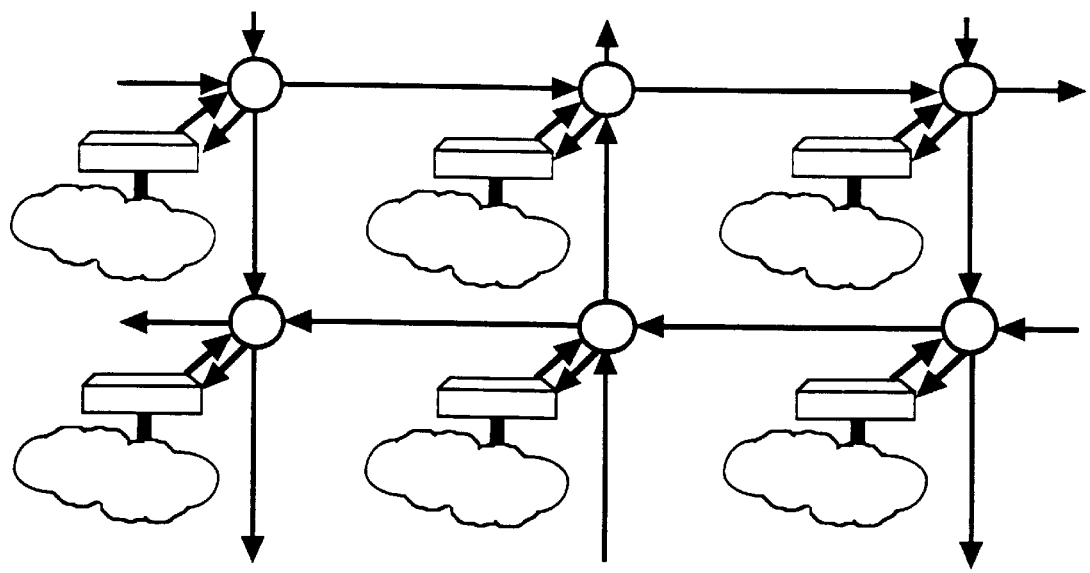
FIG. 11 shows a network embodying the present invention in use as a WAN to interconnect a number of LANs.

1. Direct interconnection of computers and workstations (FIG. 10) e.g. office/campus LAN of supercomputers/'high-end' users; e.g. distributed processing applications (examples: high quality synthetic environments—'virtual meeting place', fast complex visualisation of data in a financial institution);

2. High speed interconnection of LANs (FIG. 11)

In this case the hosts for the nodes of the ultrafast packet network are routers providing an interface with conventional lower-speed networks;

3. Mixture of 1 and 2

Figure 12:
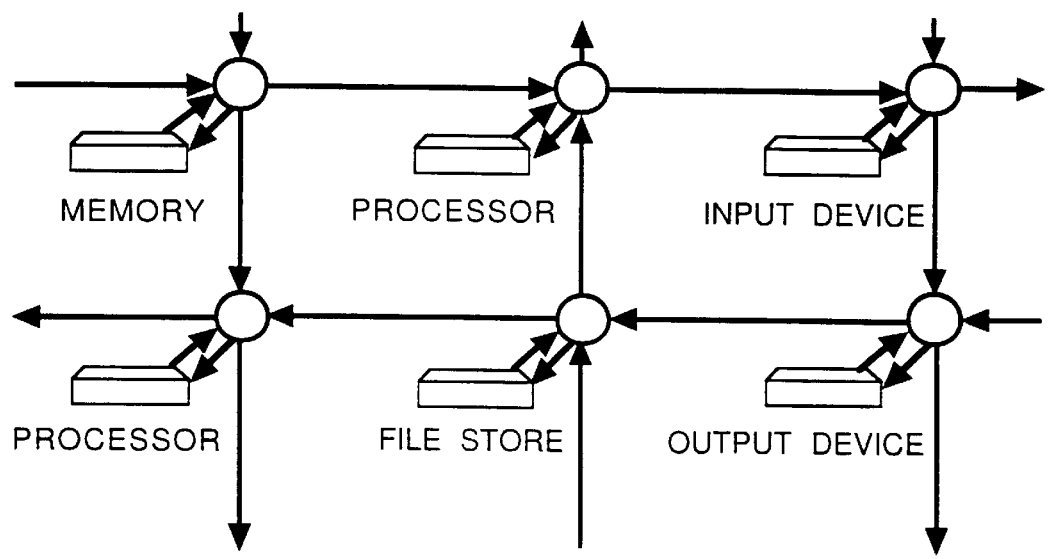
FIG. 12 is a schematic showing a network embodying the present invention used as the backbone of a multiprocessor computer system.

4. Ultrafast packet network used as the 'backbone' in the internal architecture of a large computer (FIG. 12).

Figure 13:
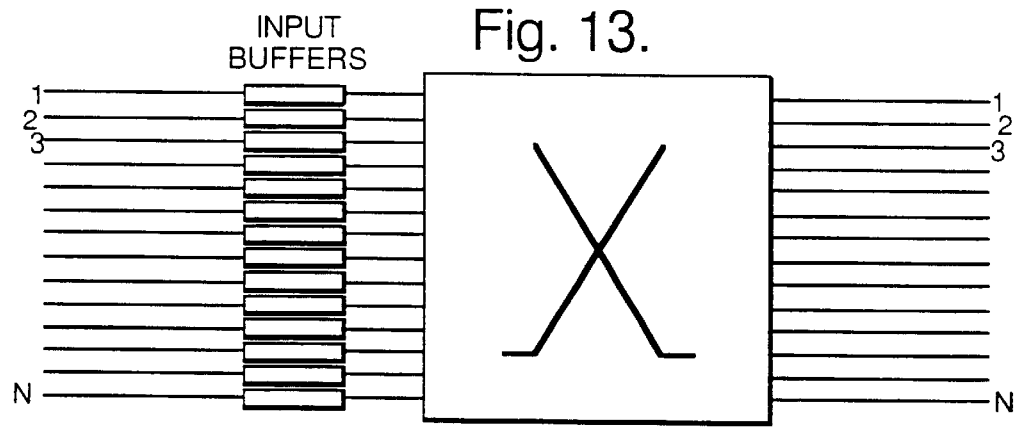
FIG. 13 shows a buffered N×N packet switch.

In this case the hosts for the nodes of the ultrafast packet network are sub-systems of the computer (processors, memory, I/O devices, and so on);

5. Ultrafast packet network used as the internal architecture of a packet switch (e.g. for very high capacity ATM) (FIGS. 13, 14).

In this case the nodes serve the input and output ports of the packet switch. FIG. 13 shows a buffered N×N packet switch (N input ports, N output ports), in which the input traffic is buffered.

In the switch design using the ultrafast packet network as a switch, the deep input buffers on the input ports are retained. If the network uses deflection routing (as in the example of the Manhattan Street Network, there may be small output buffers in the routing nodes. In that case the packet switch could be described as having both input buffers and 'internal' buffers (i.e. output buffers on the nodes of the switching network act together as buffers that are internal to the packet switch as a whole). If 'hot potato' routing is used (i.e. no output buffers on the switching nodes), then the packet switch as a whole has input buffers only.

Figure 14:
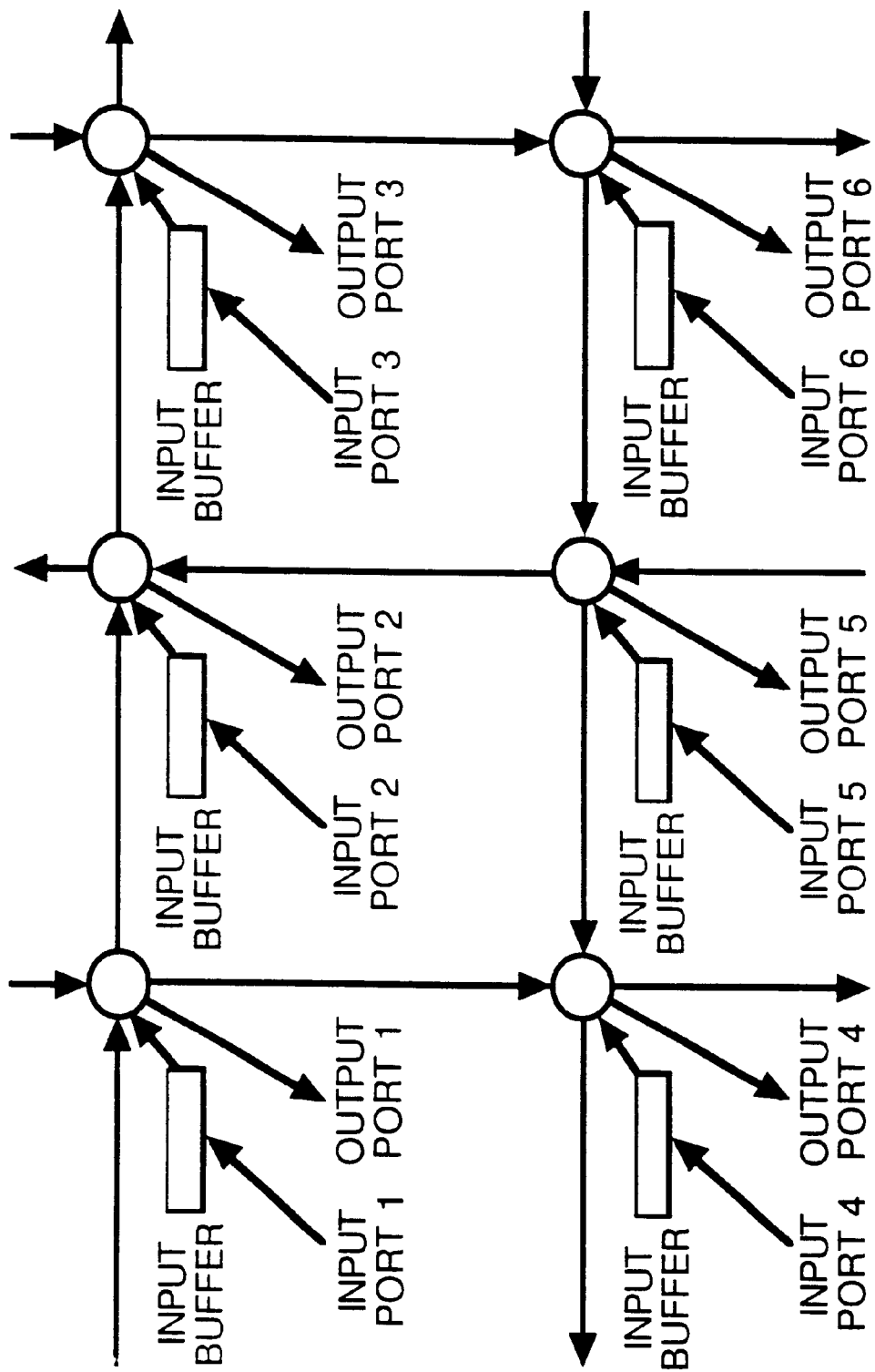
FIG. 14 shows an ultra fast packet network embodying the present invention used as the internal architecture of a packet switch.

FIG. 14 shows the structure of the packet switch.

Alternative Topologies

Figure 15:
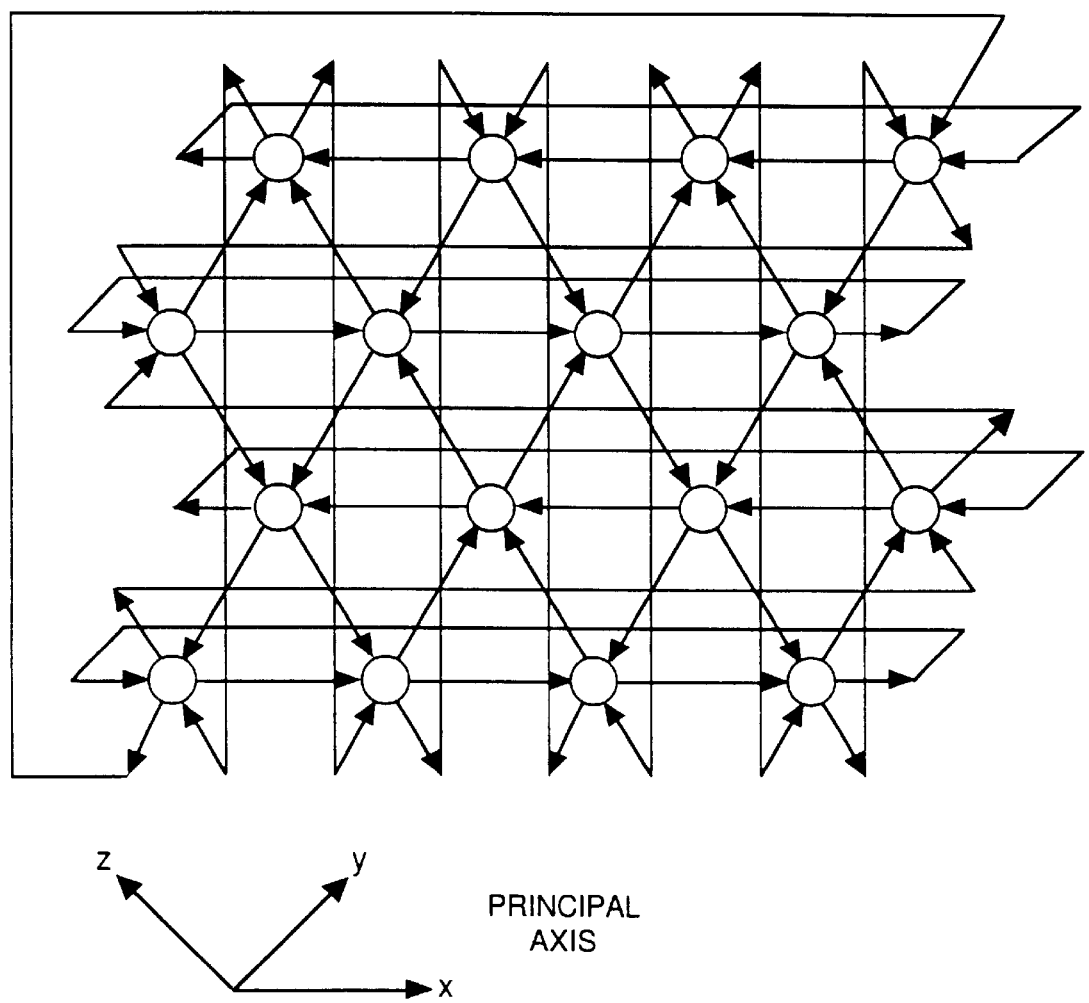
FIG. 15 shows an alternative network topology used in a system embodying the present invention.
Figure 16:
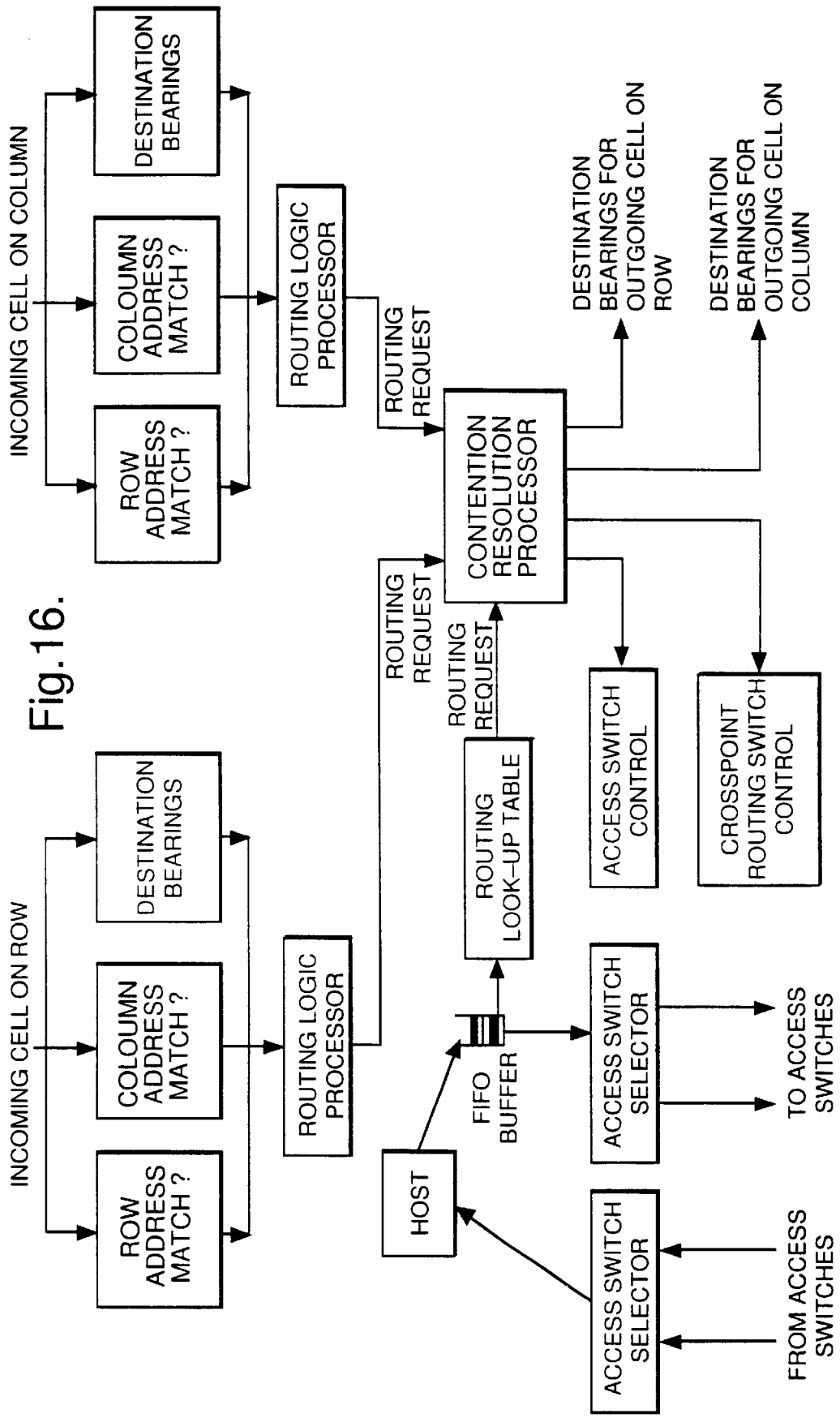
FIG. 16 is a detailed schematic of the processing stages in a node.

Although described above in relation to a MS-Net, the present invention is applicable to a wide range of different network topologies. For example the method can be used with the topology known as "triangularly arranged connection network" (TAC), first described by G E Myers and M E Zarki ("Routing in TAC: Triangularly Arranged Connection Networks", Proc. INFOCOM'90, pp.481–486 (1991)). TAC is a three-connected toroidal mesh in which nodes are located on the vertices of equilateral triangles. The FIG. 15 shows an example of a 16-node 4×4 TAC network. The number of nodes needs to be a multiple of 4 in order for the links to be oriented properly. Myers and Zarki describe a self-routing scheme that is similar to the MS-Net scheme of Maxemchuk, in that each node computes the optimum outward link for each incoming packet using as data the packet destination address (which must be read in full) and the address of the current node.

The alternative is a dead reckoning scheme as follows: The principal axes of the network are as shown in the Figure, and are labelled x, y and z.. Every link forms part of a line of links (called a row) that runs parallel to one of the principal axes (similar to the streets and avenues of the MS-Net). The address of every node has 3 fields (each field corresponds to the name of the row of links parallel to a principal axis). The destination of a packet is located at the intersection of three named rows of links, and has the address $(D_x, D_y, D_z)$. Each packet carries a set of destination bearings with respect to the principal axes. The destination bearings are represented by a 3-bit word. The routing rules for dead reckoning in the TAC are as follows. The current routing node has the address $(N_x, N_y, N_z)$.

a) A packet should, if possible, travel in the direction of one of its destination bearings. If two such directions are available, the packet does not care which of these two is selected (except in case b or c below). If three or no such directions are available, the packet does not care which path is selected (except in case b or c below).

The destination bearings are modified only in the particular circumstances now described. At each node the destination address is compared with the node address to see if $D_x=N_x$, $D_y=N_y$, or $D_z=N_z$, indicating that the packet has found a row of links on which the destination is located (and obviously if all three matching conditions are discovered to be true, then the destination has been found).

Supplementary routing rules apply when one or two of the matching conditions are discovered to be true.

b) If a packet encounters a row of links on which the destination is located, and if that row of links bears towards the destination, then the packet should turn into it if possible, otherwise proceed as in the main rule a.

c) If a packet is travelling along a row of links on which the destination is located, and is travelling in a direction that bears towards the destination, it should continue in that direction if possible, otherwise proceed as in the main rule a.

d) If a packet crosses over a row of links on which the destination is located, then the destination bearing for the packet must be checked and reset if necessary.

e) If a packet is travelling along a row of links on which the destination is located, whether or not in a direction that bears towards the destination, and then a turn is made, the destination bearings must be checked and reset if necessary.

Implementing Technologies

1. Logical operation of a node

Diagrams showing i) the logical function of a routing node using the 'dead reckoning' self-routing protocol, and ii) structure of a node, are shown in FIGS. 1 and 4 discussed above. A more detailed diagram showing the layout of processing stages in a node is given here in FIG. 16. More details about the operation of these various stages is given below.

2. Optical connections for a node

Figure 17:
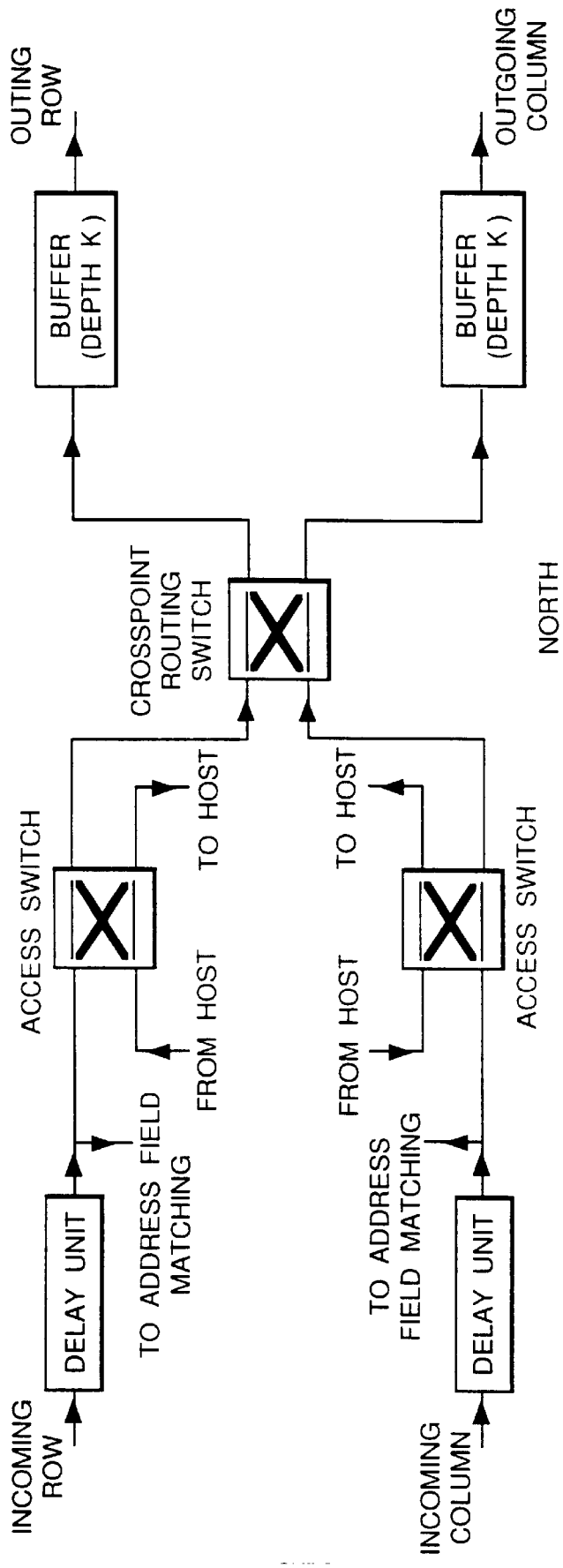
FIG. 17 shows the optical layout of a node.

The optical layout of a node is given in FIG. 17. If this is compared with FIG. 4, the general switch symbol has been replaced by three 2×2 optical switches (two 'access switches' and one 'crosspoint routing switch'). Suitable routing switches would be lithium niobate devices such as type Y-35-8772-02 supplied by GEC Advanced Components. The delay units shown in FIG. 17 could be, for example, the tunable optical delay system described by P R Prucnal (IEEE J Quantum Electronics, vol 29, no 2, pp. 600–612, 1993). The optical buffers can be of the type described by D K Hunter and I Andonovic (Electronics Letters, vol 29, no 3, pp. 280–281, 1993), in which the 2×2 switches could be the lithium niobate devices specified above, and the delay lines would be appropriately-cut lengths of optical fibre.

3. Routing Logic Processor

The routing logic processors determine the optimum onward routing for a cell, based on the routing rules stated earlier. Routing requests are received by the contention resolution processor from each of the routing logic processors on behalf of incoming cells. If a time slot on one of the incoming routes is vacant, then no routing request is issued by the corresponding routing logic processor. A routing request for a cell contains the following information: i) the requested outgoing path (row, column or don't care); ii) the destination bearings to be carried onwards by the cell if the requested crosspoint switch setting is granted; iii) the destination bearings to be carried onwards by the cell if the requested crosspoint switch setting is not granted (i.e. the cell is deflected). Usually the destination bearings carried by a particular cell are unchanged as the cell passes through a network node, whether or not the cell is deflected. However the routing rules define occasions when the destination bearings must be adjusted, and these are indicated in the detailed routing logic tables set out later.

The input to the routing logic consists of just 4 bits: does the cell's destination row address match the row address of the node? (1 bit); does the cell's destination column address match the column address of the node? (1 bit); the orientation of the east-west destination bearing (1 bit); and the orientation of the north-south destination bearing (1 bit).

A new cell to be inserted into the network from the local host is placed in a first-in first-out (FIFO) buffer and awaits a vacant network time slot. A vacant slot can arise when there is a vacancy in the incoming traffic, or when an incoming cell has been identified as having reached its destination and is switched through to the local host. The routing look-up table provides an appropriate routing request for each new cell starting out on its journey across the network. The entries in the look-up table can be determined using, for example, a shortest-path algorithm. Notice that only new cells consult the look-up table:the table is not required for cells in transit through the node, which represent the bulk of the traffic. Also the look-up procedure need operate only at the relatively slow access rate of the local host. The format of the routing request from the look-up table depends on whether the new cell is to be held in the buffer until a time-slot vacancy is available on the optimum outward path (assuming one of the two outward paths is actually preferred). If that is the case, the routing request comprises only the requested outgoing path (row or column) and the outgoing 'destination bearings'. If, however, the new cell is to be launched out into the network just as soon as a vacant time slot becomes available on an input port of the routing switch, the look-up table must provide the full 3-item routing request described earlier. In other words, in this case the routing request must provide the appropriate outgoing destination bearings for the new cell to use if it finds itself unable to exit by the preferred path.

Figure 18:
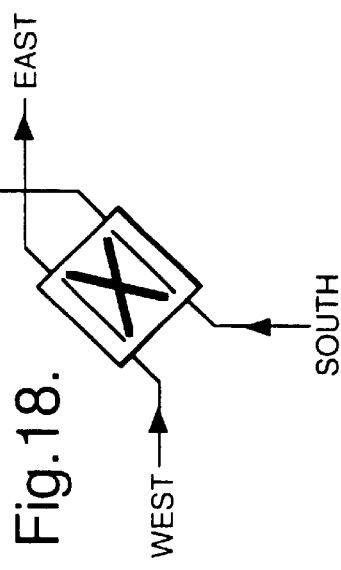
FIG. 18 illustrates the orientation of a cross-point switch with respect to the row and common directions.

The tables below show the detailed routing logic for network nodes in the various configurations of row and column directions. In effect, these tables show the mapping from the 4-bit input data to the output routing requests, based on the routing rules stated earlier. For the purpose of the tables showing the detailed routing logic, it is assumed that the 2×2 'cross-bar' routing switches at the crosspoints of the network are configured so that the 'bar' state is the straight-through direction for cells travelling in both the row and column directions, and the 'cross' switch state causes a change of direction. For example, FIG. 18 shows a crosspoint oriented with the row direction running from west to east and the column direction from south to north.

Figure 19:
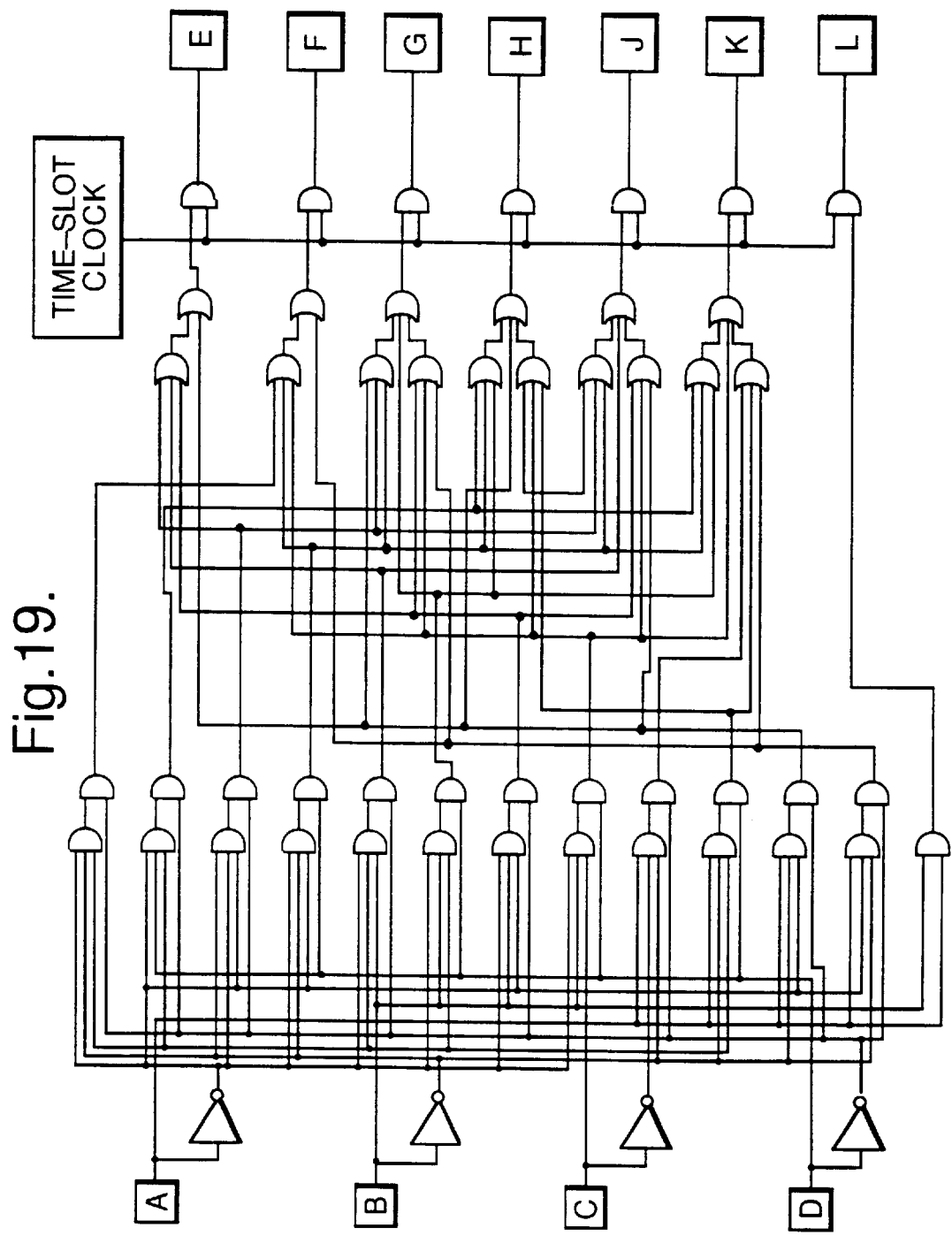
FIG. 19 shows a routing logic processor.

Based on Table 1 (i), FIG. 19 shows a circuit diagram for the routing logic processor in a crosspoint oriented west to east and south to north, for cells incoming from the west. This detailed diagram confirms that the routing logic for dead reckoning, using the 4 input bits referred to earlier, is sufficiently simple that the routing rules can be executed with hard-wired electronic circuitry using a small number of elementary boolean logic gates (invert, AND and OR), without the need for arithmetic, registers, or look-up tables. As shown, the logic circuit can be constructed with several parallel strands, and the maximum length of any strand is about 4 gates. Therefore, using ultra-high speed emitter-coupled logic devices that have very low rise and fall times (<0.2 ns) and low propagation delays (<0.6 ns), the routing logic processor can operate at high speed, producing routing requests within a small number of nanoseconds. Suitable devices are the SST ECL Logic IC family (SELIC) manufactured by NTT Electronics Technology Corporation. Part numbers are NLB6201 (quad 3-input OR/NOR gates); NLB6203 (quad 3-input AND/NAND gates); NLB6200 (quint 2-input OR/NOR gates). The latter of these could be configured as invertors for the circuits shown in FIGS. 19 and 20.

4. Contention resolution processor

Figure 20:
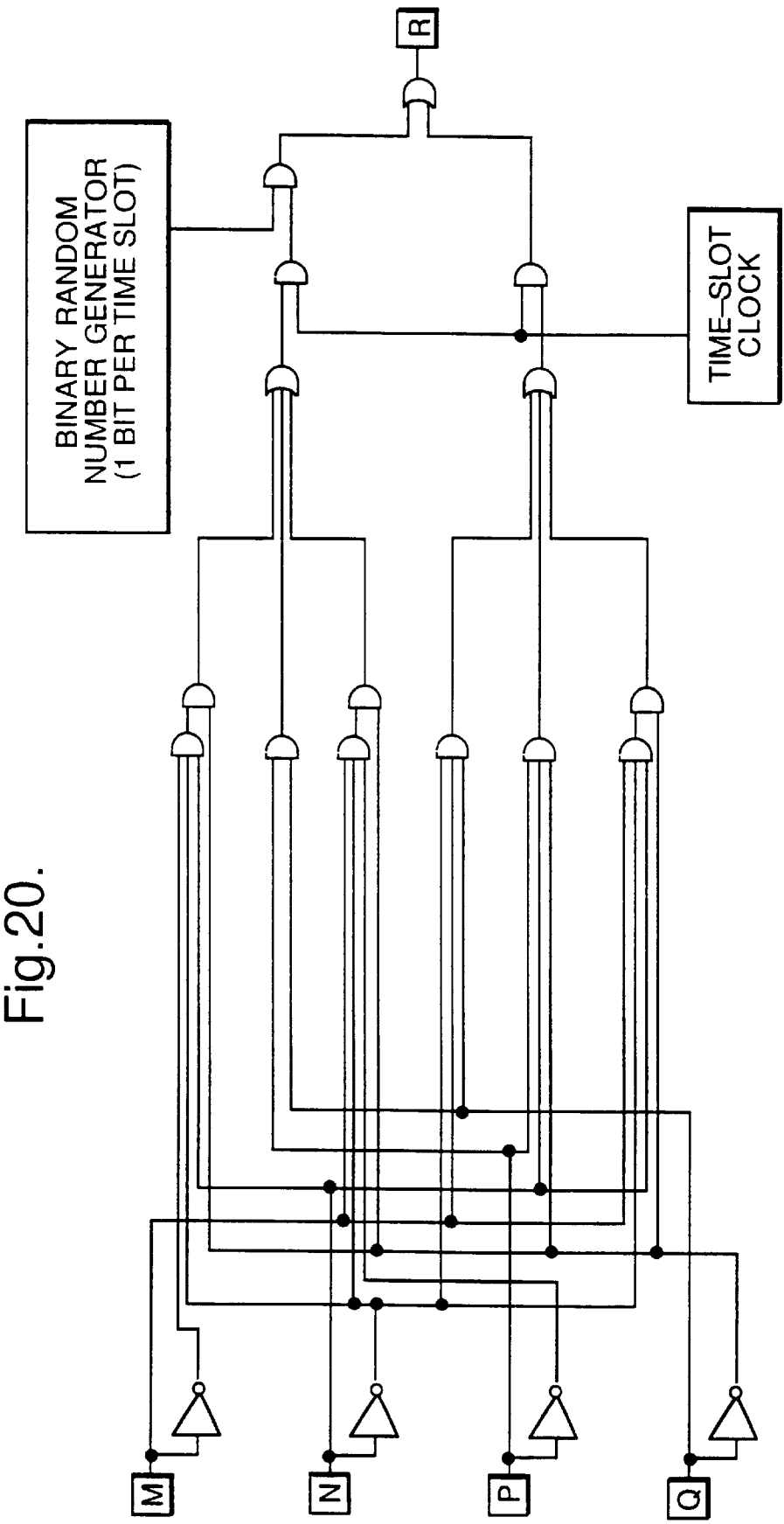
FIG. 20 shows a contention-resolution logic processor.

The contention resolution processor examines the various routing requests and determines whether two cells are expressing preferences for the same output port of the crosspoint routing switch. A suitable contention resolution procedure is described above. In this case the contention resolution procedure is simple and can be implemented by hard wiring using a small number of electronic logic gates. As an example, FIG. 20 shows the circuit diagram to execute the main task of the contention resolution logic processor, which is to give the command to the crossbar routing switch (and it is assumed here that 'hot potato' routing—i.e. no output buffers—is used). For high speed operation, the electronic logic devices used could be the same as those specified above for the routing logic processor (SST ECL Logic IC family (SELIC) manufactured by NTT Electronics Technology Corporation). If deflection routing with output buffers is used, then the logic circuit would be slightly more complicated: there would be two additional data inputs, each indicating whether one of the output buffers is full. In addition to setting the access and crosspoint routing switches, the contention resolution processor has the task of issuing the appropriate destination bearings for onward transmission. The logic circuit for this task is not shown in FIG. 20, but is very simple. For each of the two packets currently being routed, the destination bearings are taken directly from the outputs G,H or J,K from the routing logic processors (FIG. 19), depending on whether the routing request for each packet is granted or declined.

If required, a priority scheme could be introduced. There are many such schemes to choose from, most of which will require additional network signalling to represent the status of individual cells, for example: latency-sensitivity; age and time-to-live stamping; 'destination-in-sight' flag; service grade; etc. The value of these priority schemes must be judged against the additional overheads of complexity, transmission and processing time, which will tend to limit the overall network throughput. Schemes not requiring any additional network signalling include prioritisation (priority granted or declined) for new cells waiting in the access buffer.

5. Header address matching

The task of seeing whether there is a match between a field in the packet destination address and a corresponding field in the address of the routing node could be performed at ultrafast speed using the binary word recognition technique described in international patent application PCT/GB94/00397, with further technical details disclosed in PCT/GB 95/01176 page 15 line 22- page 17 line 2. The contents of these earlier applications are incorporated herein by reference. An experimental demonstration of this technique is described by D Cotter, J K Lucek, M Shabeer, K Smith, D C Rogers, D Nesset and P Gunning ("Self-routing of 100 Gbit/s packets using 6-bit address recognition", Electronics Letters, in press).

6. Arrangements for communicating the destination bearings

As already described, various ways of communicating the destination bearings are possible and the necessary amount of information carried by each packet can be very small: just 2 bits in the case of the MS-Net.

A way of communicating the destination bearings using a separate time segment is now described.

Figure 21:
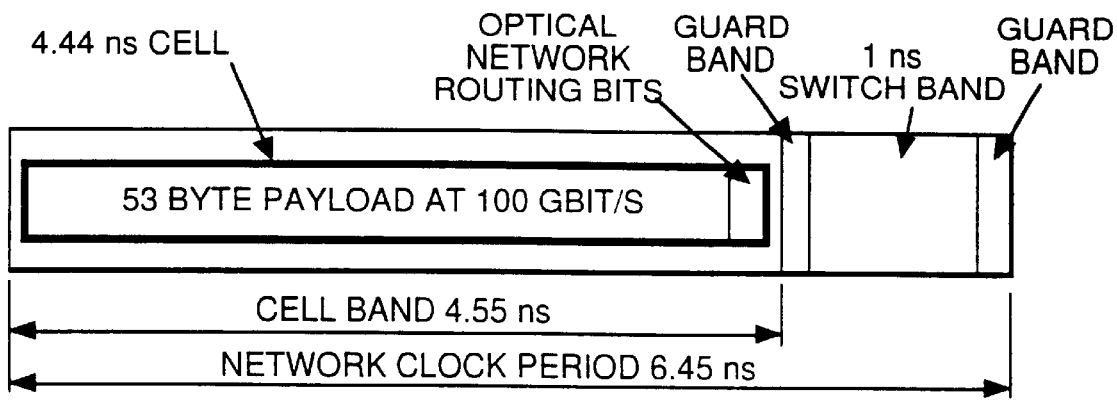
FIG. 21 shows the structure of a network time slot.
Figure 22:
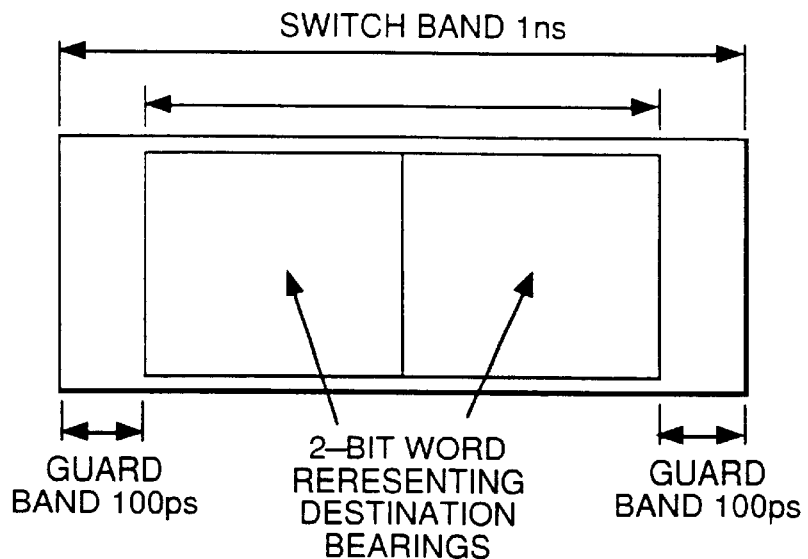
FIG. 22 shows the sub-division of the switchband.
Figure 23:
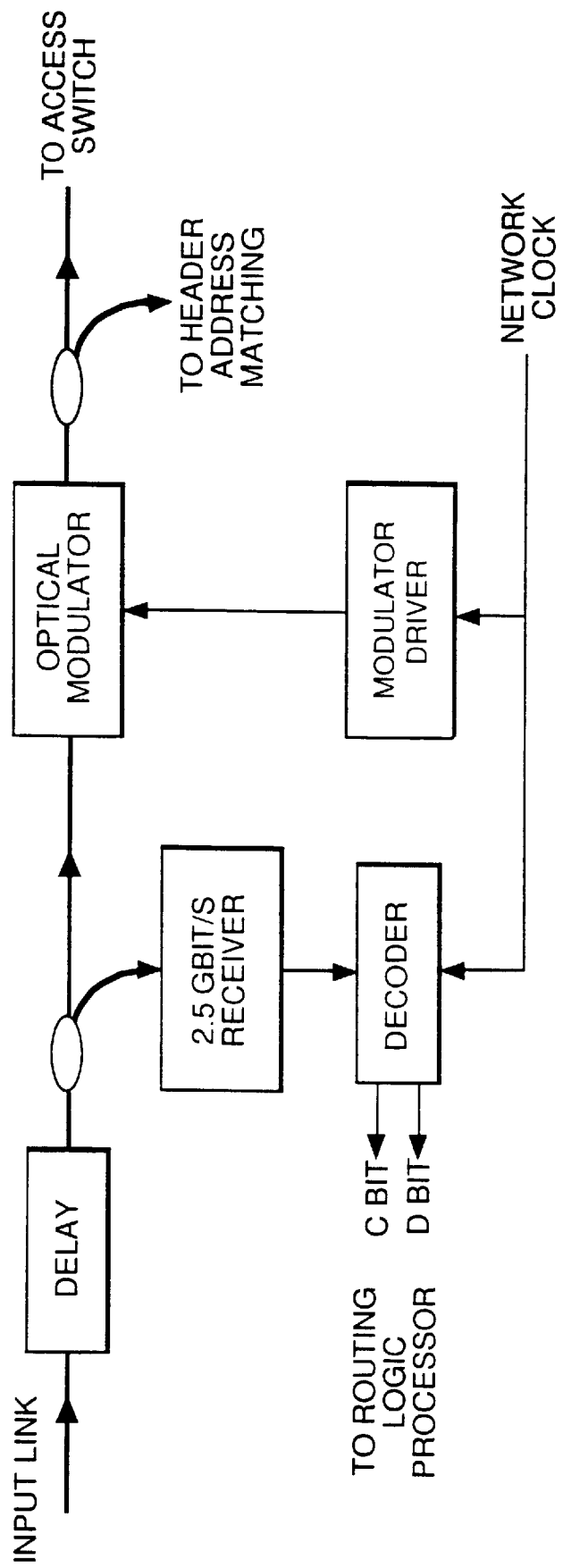
FIG. 23 shows the structure of circuits on the input to the access switch.

FIG. 21 shows an example of a network time slot. In this slot we combine localised fine-grain (bit-level) timing extraction on a packet-by-packet basis together with global coarse-grain (packet-level) timing. This diagram illustrates the relationship between the bit-level and packet-level time references. The network clock provides only coarse network synchronisation at the packet level. The network is thus slotted in time and space, at the clock frequency, with a maximum of one cell occupying each slot. In the example shown in FIG. 21, the time partitioning within the time slot has been dimensioned to accommodate standard ATM cells. The network clock has been chosen to be one of the standard SDH rates. The cell consists of a burst of ultrashort optical pulses representing about 440 bits (the 53-byte ATM cell plus around 10–20 additional header bits to allow routing of the cell in the ultrafast optical packet network) at an instantaneous rate of 100 Gbit/s. Notice that the position of the cell within its time slot is not defined with bit-level precision; instead there is a timing tolerance equal to several bit periods (around 100 picoseconds or 10 bit periods in this example). The network time slot also contains a switch band, allowing time for the reconfiguration of routing switches, and time guard bands. It is necessary for this switch band to be equivalent to many bit periods. For example, typical routing switches (lithium niobate devices such as type Y-35-8772-02 supplied by GEC Advanced Components, or 2×2 integrated InP semiconductor of the type described by G Sherlock et al in Electronics Letters 30, 137–138, 1994) are capable of switching configuration in a time of ~1 ns. Therefore for cells with an instantaneous bit rate of 100 Gbit/s, a 1 ns switch band is equivalent to 100 bit periods. The 1 ns-wide 'switch band' allows time for the reconfiguration of the routing switches. However this time slot could be reused for transmission of the destination bearings from one node to the next, on a link-by-link basis. FIG. 22 shows how the switch band would be divided into further sub-bands for use in transmitting the destination bearing signals: two 100 ps-wide guard bands and an 800 ps-wide band which contains 2 bits of a 2.5 Gbit/s signal(representing the 2-bit 'destination bearings' word needed for dead reckoning in the MS-Net). FIG. 23 shows the arrangement for receiving these signals on an input link at a routing node. The additional components required are positioned after the delay unit shown in FIG. 17. The 2.5 Gbit/s receiver could be BT&D type PDC 2201-2.4-FP. The decoder circuit would read in the signal bits, and output them as C and D bits to the routing logic processor (FIG. 19). The optical modulator shown in FIG. 23 performs the task of removing the 2.5 Gbit/s signals from the packet before reaching the access switch or address-field matching devices. The optical modulator must be capable of switching on or off in correct synchronism with the network clock in a time window of 100 ps, and provide 20 dB optical contrast ratio. A suitable device is the multiple-quantum well semiconductor electro-absorption modulator described by D. G. Moodie, A. D. Ellis, and C. W. Ford (in "Generation of 6.3 ps optical pulses at a 10 GHz repetition rate using a packaged electro-absorption modulator and dispersion compensating fibre," Electron. Lett., vol. 30, no. 20, pp. 1700–1701, 1994).

Figure 24:
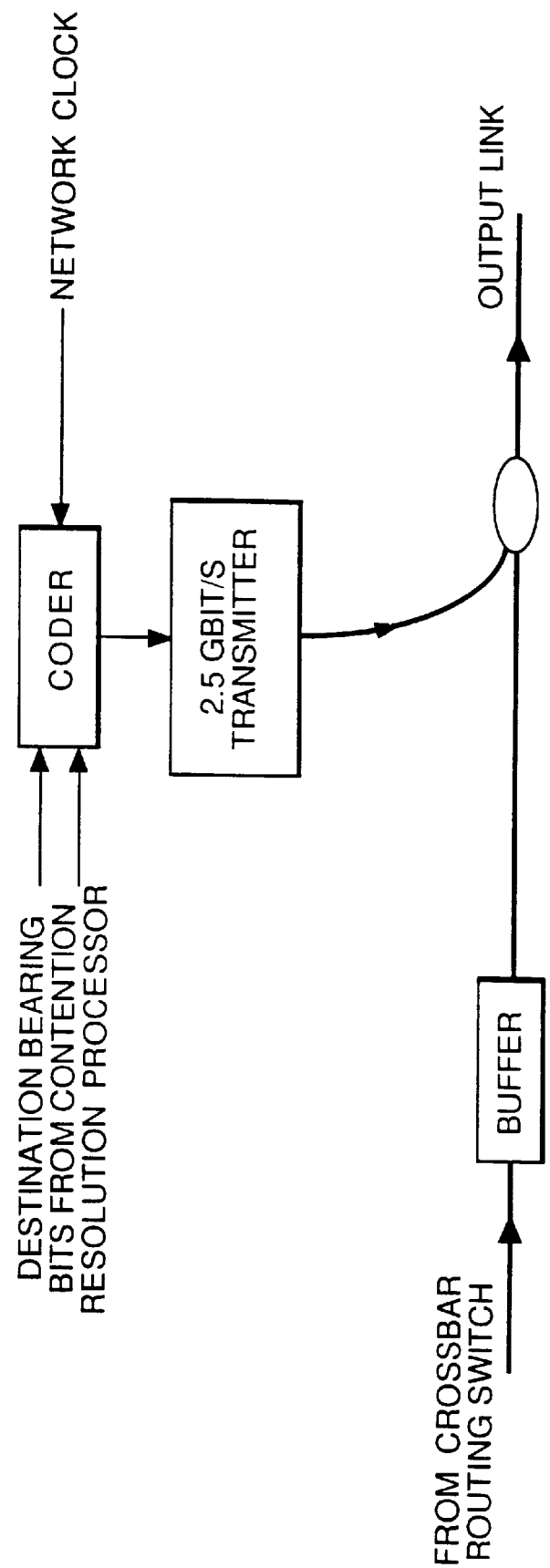
FIG. 24 shows circuits for insertion of signals into a packet leaving the node.

FIG. 24 shows the arrangement for inserting the 2.5 Gbit/s signals into the appropriate time band for a packet leaving a node. The components shown in FIG. 24 would be inserted after the output buffer shown in FIG. 17. The 2.5 Gbit/s optical transmitter could be of the DFB laser type with integral optical isolator, such as device QLM5S710 supplied by Lasertron Inc. The coder takes the appropriate destination bearing bits from the contention resolution processor, and provides an appropriate signal (the 2-bit 2.5 Gbit/s word described above) to the transmitter with the correct time synchronisation to the network clock.

Tables TF19 and TF20 below are keys to the input and output data of the logic circuits of FIG. 19 and 20 respectively.

TABLES MS-NET ROUTING

| Input data | | | Routing request | | |
|---|---|---|---|---|---|
| Destination row? | Destination column? | Incoming destination bearings | Crosspoint switch setting | Outgoing destination bearings (requested routing) | Outgoing destination bearings (deflected routing) |

1. Crosspoint oriented west→east and south→north i) Routing logic table for cell incoming from the west

| | | | | | |
|---|---|---|---|---|---|
| No | No | E, N | don't care | E, N | |
| | | E, S | bar | E, S | E, S |
| | | W, N | cross | W, N | W, N |
| | | W, S | don't care | W, S | |
| | Yes | E, N | cross | E, N | W, N† |
| | | E, S | bar | W, S† | E, S |
| | | W, N | cross | W, N | W, N |
| | | W, S | don't care | W, S | |
| Yes | No | E, N | bar | E, N | E, S† |
| | | E, S | bar | E, S | E, S |
| | | W, N | cross | W, S† | W, N |
| | | W, S | don't care | W, S | |
| | Yes | any | don't care (destination reached) | | | ii) Routing logic table for a cell incoming from the south

| | | | | | |
|---|---|---|---|---|---|
| No | No | E, N | don't care | E, N | |
| | | E, S | cross | E, S | E, S |
| | | W, N | bar | W, N | W, N |
| | | W, S | don't care | W, S | |
| | Yes | E, N | bar | E, N | W, N† |
| | | E, S | cross | W, S† | E, S |
| | | W, N | bar | W, N | W, N |
| | | W, S | don't care | W, S | |
| Yes | No | E, N | cross | E, N | E, S† |
| | | E, S | cross | E, S | E, S |
| | | W, N | bar | W, S† | W, N |
| | | W, S | don't care | W, S | |
| | Yes | any | don't care (destination reached) | | |

2. Crosspoint oriented east→west and south→north i) Routing logic table for cell incoming from the east

| | | | | | |
|---|---|---|---|---|---|
| No | No | E, N | cross | E, N | E, N |
| | | E, S | don't care | E, S | |
| | | W, N | don't care | W, N | |
| | | W, S | bar | W, S | W, S |
| | Yes | E, N | cross | E, N | E, N |
| | | E, S | don't care | E, S | |
| | | W, N | cross | W, N | E, N† |
| | | W, S | bar | E, S† | W, S |
| Yes | No | E, N | cross | E, S† | E, N |
| | | E, S | don't care | E, S | |
| | | W, N | bar | W, N | W, S† |
| | | W, S | bar | W, S | W, S |
| | Yes | any | don't care (destination reached) | | | ii) Routing logic table for a cell incoming from the south

| | | | | | |
|---|---|---|---|---|---|
| No | No | E, N | bar | E, N | E, N |
| | | E, S | don't care | E, S | |
| | | W, N | don't care | W, N | |
| | | W, S | cross | W, S | W, S |
| | Yes | E, N | bar | E, N | E, N |
| | | E, S | don't care | E, S | |
| | | W, N | bar | W, N | E, N† |
| | | W, S | cross | E, S† | W, S |
| Yes | No | E, N | bar | E, S† | E, N |
| | | E, S | don't care | E, S | |
| | | W, N | cross | W, N | W, S† |
| | | W, S | cross | W, S | W, S |
| | Yes | any | don't care (destination reached) | | |

TABLES MS-NET ROUTING

| Input data | | | Routing request | | |
|---|---|---|---|---|---|
| Destination row? | Destination column? | Incoming destination bearings | Crosspoint switch setting | Outgoing destination bearings (requested routing) | Outgoing destination bearings (deflected routing) |

3. Crosspoint oriented west→east and north→south i) Routing logic table for cell incoming from the west

| | | | | | |
|---|---|---|---|---|---|
| No | No | E, N | bar | E, N | E, N |
| | | E, S | don't care | E, S | |
| | | W, N | don't care | W, N | |
| | | W, S | cross | W, S | W, S |
| | Yes | E, N | bar | W, N† | E, N |
| | | E, S | cross | E, S | W, S† |
| | | W, N | don't care | W, N | |
| | | W, S | cross | W, S | W, S |
| Yes | No | E, N | bar | E, N | E, N |
| | | E, S | bar | E, S | E, N† |
| | | W, N | don't care | W, N | |
| | | W, S | cross | W, N† | W, S |
| | Yes | any | don't care (destination reached) | | | ii) Routing logic table for a cell incoming from the north

| | | | | | |
|---|---|---|---|---|---|
| No | No | E, N | cross | E, N | E, N |
| | | E, S | don't care | E, S | |
| | | W, N | don't care | W, N | |
| | | W, S | bar | W, S | W, S |
| | Yes | E, N | cross | W, N† | E, N |
| | | E, S | bar | E, S | W, S† |
| | | W, N | don't care | W, N | |
| | | W, S | bar | W, S | W, S |
| Yes | No | E, N | cross | E, N | E, N |
| | | E, S | cross | E, S | E, N† |
| | | W, N | don't care | W, N | |
| | | W, S | bar | W, N† | W, S |
| | Yes | any | don't care (destination reached) | | |

4. Crosspoint oriented east→west and north→south i) Routing logic table for cell incoming from the east

| | | | | | |
|---|---|---|---|---|---|
| No | No | E, N | don't care | E, N | |
| | | E, S | cross | E, S | E, S |
| | | W, N | bar | W, N | W, N |
| | | W, S | don't care | W, S | |
| | Yes | E, N | don't care | E, N | |
| | | E, S | cross | E, S | W, S† |
| | | W, N | bar | E, N† | W, N |
| | | W, S | cross | W, S | W, S |
| Yes | No | E, N | don't care | E, N | |
| | | E, S | cross | E, N† | E, S |
| | | W, N | bar | W, N | W, N |
| | | W, S | bar | W, S | W, N† |
| | Yes | any | don't care (destination reached) | | | ii) Routing logic table for cell incoming from the north

| | | | | | |
|---|---|---|---|---|---|
| No | No | E, N | don't care | E, N | |
| | | E, S | bar | E, S | E, S |
| | | W, N | cross | W, N | W, N |
| | | W, S | don't care | W, S | |
| | Yes | E, N | don't care | E, N | |
| | | E, S | bar | E, S | E, S |
| | | W, N | cross | E, N† | W, N |
| | | W, S | bar | W, S | E, S† |
| Yes | No | E, N | don't care | E, N | |
| | | E, S | bar | E, N† | E, S |
| | | W, N | cross | W, N | W, N |
| | | W, S | cross | W, S | W, N† |
| | Yes | any | don't care (destination reached) | | |

†Incoming and outgoing destination bearing differ.

TABLE I

The efficiency of various routing schemes in MS-Nets of dimension m × n, relative to the shortest-path algorithm.

| | Dead reckoning | | | | Maxemchuk's deterministic routing rules (7) | | Random routing (7) | |
|---|---|---|---|---|---|---|---|---|
| MS.Net m × n | Average shortest path (no. hops) | Average distance (no. hops) | 95% confid. interval | Routing efficiency | Rule 1 routing efficiency | Rules 2, 3 routing efficiency | Rule A routing efficiency | Rule B routing efficiency |
| 4 × 4 | 2.93333 | 2.93425 | ±0.0010 | 1.000 | 1.00 | 1.00 | 0.21 | 0.79 |
| 4 × 6 | 3.30435 | 3.56913 | ±0.0018 | 0.926 | 1.00 | 0.97 | 0.14 | 0.30 |
| 6 × 6 | 3.71429 | 4.11485 | ±0.0021 | 0.903 | 1.00 | 0.97 | 0.10 | 0.21 |
| 6 × 8 | 4.34043 | 4.83034 | ±0.0022 | 0.899 | 1.00 | 0.98 | 0.09 | 0.17 |
| 6 × 10 | 4.77966 | 5.45208 | ±0.0022 | 0.877 | | | | |
| 8 × 8 | 5.01587 | 5.53993 | ±0.0015 | 0.905 | 1.00 | 1.00 | 0.07 | 0.14 |
| 8 × 10 | 5.41772 | 6.11441 | ±0.0026 | 0.886 | 1.00 | 0.99 | 0.06 | 0.11 |
| 10 × 10 | 5.83838 | 6.64861 | ±0.0028 | 0.878 | 1.00 | 0.99 | 0.05 | 0.09 |
| 10 × 12 | 6.42017 | 7.28788 | ±0.0032 | 0.881 | 1.00 | 0.99 | 0.05 | 0.08 |
| 12 × 12 | 7.02098 | 7.91374 | ±0.0030 | 0.887 | 1.00 | 1.00 | 0.04 | 0.07 |
| 12 × 14 | 7.44910 | 8.46980 | ±0.0046 | 0.879 | 1.00 | 1.00 | 0.04 | 0.06 |
| 14 × 14 | 7.88718 | 8.99996 | ±0.0043 | 0.876 | 1.00 | 0.99 | 0.03 | 0.06 |
| 16 × 16 | 9.01961 | 10.19614 | ±0.0030 | 0.885 | | | | |
| 18 × 18 | 9.91330 | 11.3240 | ±0.0037 | 0.876 | | | | |
| 22 × 22 | 11.9296 | 13.5973 | ±0.0038 | 0.877 | | | | |
| 24 × 24 | 13.0157 | 14.7628 | ±0.0066 | 0.882 | | | | |

TABLE I-continued

The efficiency of various routing schemes in MS-Nets of dimension m × n, relative to the shortest-path algorithm.

| MS.Net m × n | Average shortest path (no. hops) | Dead reckoning | | | Maxemchuk's deterministic routing rules (7) | | Random routing (7) | |
|---|---|---|---|---|---|---|---|---|
| | | Average distance (no. hops) | 95% confid. interval | Routing efficiency | Rule 1 routing efficiency | Rules 2, 3 routing efficiency | Rule A routing efficiency | Rule B routing efficiency |
| 26 × 26 | 13.9407 | 15.8578 | ±0.0061 | 0.879 | | | | |
| 32 × 32 | 17.0127 | 19.2481 | ±0.0085 | 0.884 | | | | |
| 48 × 48 | 25.0091 | 28.1283 | ±0.0088 | 0..889 | | | | |
| 50 × 50 | 25.9696 | 29.2233 | ±0.0107 | 0.889 | | | | |
| 62 × 62 | 31.9755 | 35.8524 | ±0.0138 | 0.892 | | | | |
| 64 × 64 | 33.0071 | 36.9633 | ±0.0116 | 0.893 | | | | |

TF19

CIRCUIT DIAGRAM FOR CONTENTION-RESOLUTION LOGIC PROCESSOR
(Hot potato routing of two input packets, labelled A and B)

INPUT DATA

M, N: Routing request tor packet A
   M: Crosspoint switch setting: 0 = bar, 1 = cross
   N: Crosspoint switch setting care/don't care: 0 = care, 1 = don't care P, Q: Routing request for packet B
   P: Crosspoint switching setting: 0 = bar, 1 = cross
   Q: Crosspoint switch setting care/don't care: 0 = care, 1 = don't care

OUTPUT DATA (TO CROSSBAR ROUTING SWITCH)

R: Crosspoint switch setting: 0 = bar, 1 = cross

CIRCUIT DIAGRAM FOR ROUTING LOGIC PROCESSOR
(Crosspoint oriented west→east and south→north, cells incoming from the west)

INPUT DATA

A: Node row = destination row? 0 = No, 1 = Yes
B: Node column = destination column? 0 = No, 1 = Yes
C: East-west destination bearing: 0 = east, 1 = west
D: North-south destination bearing: 0 = north, 1 = south

OUTPUT DATA (ROUTING REQUEST)

E: Crosspoint switch setting: 0 = bar, 1 = cross
F: Crosspoint switch setting care/don't care: 0 = care, 1 = don't care
G, H: Output destination bearings (requested routing granted)
   G: 0 = east, 1 = west
   H: 0 = north, 1 = south
J, K: Output destination bearings (requested routing not granted)
   J: 0 = east, 1 = west
   K: 0 = north, 1 = south
L: Node is destination? 0 = No, 1 = Yes

What is claimed is:

1. A method of routing a packet carried on a network having a generally regular topology comprising:
   (a) receiving a packet at a node;
   (b) reading a destination address and a directional flag, both of which are carried with the packet, the directional flag indicating explicitly a preferred direction of onward travel for the packet without indicating the magnitude of travel needed to reach the destination;
   (c) terminating the travel of said packet when the node address equals the destination address;
   (d) otherwise making a local routing decision according to the value of the directional flag; and
   (e) outputting the packet from the node in a direction selected in accordance with the routing decision.

2. A method according to claim 1, in which the packet is an optical packet carried on an optical network.

3. A method according to claim 2, including carrying out logical operations in the optical domain on information carried with the packet, and using the results of the logical operations in making a routing decision in step (c).

4. A method according to claim 1 in which the network has at least two dimensions, and the packet carries at least two directional flags, one for each dimension of the network.

5. A method according to claim 4, further comprising comparing the destination address with the node address, and when the destination address is not the node address, but at least one field of destination address and node address correspond, then writing a new value for one or more of the directional flags carried by the packet.

6. A method according to claim 1, in which the node, when it receives simultaneously two or more packets having the same preferred direction of onward travel, outputs one of the packets in a direction which is not the preferred direction.

7. A method according to claim 1, in which the packet is first put onto the network at an originating node and the originating node determines from the destination address a direction of travel generally corresponding to the shortest route from the originating node to the destination address, and sets the or each directional flag accordingly.

8. A method according to claim 1, in which the network has a toroidal topology.

9. A method according to claim 1 in which the network has an irregular addressing scheme.

10. A node for routing packets carried on a generally regular network, the node comprising:
   a) an input for receiving a packet;
   b) a routing decision unit for making a local routing decision using information carried by the packet, the routing decision unit including means for terminating the travel of said packet when the node address equals the destination address and responsive to a directional flag carried by the packet indicating explicitly a preferred direction of onward travel without indicating the magnitude of travel needed to reach the destination;

c) a plurality of outputs for directing the packet onto the network in different respective directions; and d) means for directing a packet to different respective ones of the plurality of outputs depending on an output of the routing decision unit.

11. A node according to claim 10 arranged to receive an optical packet at the input to the node.

12. A node according to claim 11 including one or more optical logic gates for carrying out a logical operation in the optical domain on information carried by the packet.

13. A node according to claim 12, in which the output of the or each logic gate is connected to the routing decision unit.

14. A network having a generally regular topology and including a plurality of nodes according to claim 10.

15. A network according to claim 14, in which the network has a toroidal topology.

16. A network according to claim 15 having a Manhattan-Street-Network (MS Net) topology.

17. A network according to claim 14, in which the network is an optical network.

18. A computer system comprising a plurality of processors interconnected by a network according to claim 14.

19. A local area network (LAN) comprising a network according to claim 14.

20. A switch for use in a telecommunications network, including a network according to claim 14.

21. A network according to claim 14, having an irregular addressing scheme.

22. A node according to claim 10, in which the node is arranged to be connected in a network having at least two dimensions and the routing decision unit is arranged to make a routing decision based on values of at least two directional flags, in use, the packet carrying one flag for each dimension of the network.

23. A method of routing packet data on a network of nodes when onward routing decisions between intermediate nodes are locally made at each node, said method comprising:

including with a packet of both a node destination address and directional flag data which does not fully determine a routing path for the packet but which does indicate at least one preferred direction of onward travel for the packet without indicating the magnitude of travel needed to reach the destination; and making a local onward routing decision at each intermediate node according to the directional flag data or terminating the travel of said packet when the node address equals the destination address.

24. A method as in claim 23 in which the packet is an optical packet carried on an optical network.

25. A method as in claim 24 including:

carrying out logical operations in the optical domain on information carried with the packet, and using the results of the logical operations in making said onward routing decision.

26. A network having a generally regular topology and including a plurality of nodes according to claim 23.

27. A computer system comprising a plurality of processors interconnected by a network as in claim 26.

28. A local area network (LAN) comprising a network as in claim 26.

29. A switch for use in a telecommunications network, including a network as in claim 26.

30. A network as in claim 26 having an irregular addressing scheme.

31. A method as in claim 23 further comprising:

comparing the destination address with the local node address, and when the destination address is not the local node address, but at least one field of destination address and node address correspond indicating that at least one network dimension of the address has been reached, then writing a new value for at least some of the directional flag data carried by the packet.

32. A method as in claim 23 in which when a local node simultaneously receives two or more packets having a same preferred direction of onward travel, outputs one of the packets in a direction which is not a preferred direction.

33. A method as in claim 23, in which a packet is first put onto the network at an originating node which determines from the destination address a direction of travel generally corresponding to the shortest route from the originating node to the destination address, and sets the directional flag data accordingly.

34. A method as in claim 23 in which the network has an irregular addressing scheme.

35. A node for making local onward routing decisions for packets of data to be carried through network of similar nodes, said node comprising:

a routing decision unit connected to make onward routing decisions responsive to a directional flag data carried by each incoming packet which identifies a preferred direction of onward travel without firstly identifying an entire routing path for the packet without indicating the magnitude of travel needed to reach the destination;

a plurality of outputs connected to onwardly directing a packet within the network in different respective directions; and a switch connected to direct a packet to different respective ones of the outputs depending on an output of the routing decision unit or terminating the travel of said packet when the node address equals the destination address.

36. A node as in claim 35 wherein said routing decision unit includes one or more optical logic gates for carrying out a logical operation in the optical domain on directional flag and destination information carried by a packet.

* * * * *